US006026397A

United States Patent [19]
Sheppard

[11] Patent Number: 6,026,397
[45] Date of Patent: *Feb. 15, 2000

[54] DATA ANALYSIS SYSTEM AND METHOD

[75] Inventor: Colin P. Sheppard, Camberley, United Kingdom

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/651,319

[22] Filed: May 22, 1996

[51] Int. Cl.$^7$ ...................................................... G06F 17/30
[52] U.S. Cl. ...................................................... 707/5; 707/2
[58] Field of Search .............................. 707/5, 2; 381/56;
345/440; 704/256; 364/554, 420; 371/22.4;
84/607; 360/77.03; 701/35; 455/433; 395/200.06

[56] References Cited

U.S. PATENT DOCUMENTS

| | | | |
|---|---|---|---|
| 4,653,021 | 3/1987 | Takagi | 364/900 |
| 5,033,087 | 7/1991 | Bahl et al. | 704/256 |
| 5,097,428 | 3/1992 | Crosby | 364/554 |
| 5,168,565 | 12/1992 | Morita | 707/1 |
| 5,227,874 | 7/1993 | Von Kohorn | 358/84 |
| 5,287,275 | 2/1994 | Kimura | 364/419.01 |
| 5,305,219 | 4/1994 | Ishibashi | 701/35 |
| 5,319,509 | 6/1994 | Michelson et al. | 360/77.03 |
| 5,375,244 | 12/1994 | McNair | 395/725 |
| 5,397,893 | 3/1995 | Minette | 250/254 |
| 5,412,152 | 5/1995 | Kageyama et al. | 84/607 |
| 5,418,972 | 5/1995 | Takeuchi et al. | 395/200.06 |
| 5,425,035 | 6/1995 | Spence et al. | 371/22.4 |
| 5,442,778 | 8/1995 | Pedersen et al. | 707/5 |
| 5,483,650 | 1/1996 | Pedersen et al. | 707/5 |
| 5,537,491 | 7/1996 | Mahoney et al. | 382/218 |
| 5,544,248 | 8/1996 | Date | 381/56 |
| 5,557,655 | 9/1996 | Lantto | 455/433 |
| 5,566,069 | 10/1996 | Clark, Jr. et al. | 364/420 |
| 5,574,837 | 11/1996 | Clark et al. | 345/440 |
| 5,701,400 | 12/1997 | Amado | 395/76 |
| 5,704,017 | 12/1997 | Heckerman et al. | 395/61 |
| 5,710,915 | 1/1998 | McElhiney | 707/3 |
| 5,742,706 | 4/1998 | Yu | 707/2 |
| 5,787,420 | 7/1998 | Tukey et al. | 707/5 |

OTHER PUBLICATIONS

IBM advertisement entitled "IBM Intelligent Miner for AIX, Stepping up to the challenge" dated Apr. 1996.
IBM advertisement entitled "Data Mining Gives John Hancock the Competitive Advantage" dated 1996.
IBM advertisement entitled "ShopKo Mines Customer Data to Improve Promotions" dated 1996.
IBM advertisement entitled "HIC Provides More Efficient Healthcare with IBM Data Mining" dated 1996.
IBM advertisement entitled "Data Mining: A New Weapon for Competitive Advantage" dated 1995.
IBM advertisement entitled "IBM Announces Data Mining Solutions" dated Apr. 4, 1996.
Chang et al, Customizable Multi–Engine Search Tool with Clustering, Elsevier Science, pp. 12–17–1224 Dec. 1997.
Shaw et al, Performance Standards and Evaluatins in IR Test Collections: Cluster–Based Retieval Models, Elsevier Science, pp. 1–14 Aug. 1995.
Elmasri et al, Fundamentals of Database Systems, Addison Wesling Publishing, pp. 103–112, 1994.

*Primary Examiner*—Thomas G. Black
*Assistant Examiner*—Frantz Coby
*Attorney, Agent, or Firm*—L. Joy Griebenow; Baker & Botts L.L.P.

[57] ABSTRACT

A system (10) for analyzing a data file containing a plurality of data records with each data record containing a plurality of parameters is provided. The system (10) includes an input (40) for receiving the data file and a data processor (32) having at least one of several data processing functions. These data processing functions include, for example, a segmentation function (34) for segmenting the data records into a plurality of segments based on the parameters. The data processing functions also include a clustering function (36) for clustering the data records into a plurality of clusters containing data records having similar parameters. A prediction function (38) for predicting expected future results from the parameters in the data records may also be provided with the data processor (32).

66 Claims, 25 Drawing Sheets

FIG. 4

Rule Based Segmentation

Set up... — 102

Show information for parameters [AGE]  — 114

Rules

| Bin | Test name | Size | %Total | %Parent | Mean | SD | Min | Max |
|---|---|---|---|---|---|---|---|---|
| 0 | All Records | 20000 | 100 | N/A | 53.22 | 16.22 | 18 | 94 |
| 1 | Male | 9414 | 47.07 | 47.07 | 54.81 | 16.59 | 18 | 94 |
| 2 | Unmarried | 2080 | 10.4 | 22.09 | 46.57 | 19.31 | 18 | 93 |
| 3 | Young | 937 | 4.685 | 45.04 | 28.87 | 5.294 | 18 | 39 |
| 4 | Old | 1143 | 5.715 | 54.95 | 61.07 | 13.74 | 40 | 93 |
| 5 | Married | 7334 | 36.67 | 77.9 | 57.15 | 14.93 | 18 | 94 |
| 6 | Young | 1046 | 5.23 | 14.26 | 34 | 3.956 | 18 | 39 |
| 7 | Old | 6288 | 31.44 | 85.73 | 61 | 12.39 | 40 | 94 |
| 8 | Female | 10586 | 52.93 | 52.93 | 51.81 | 15.74 | 18 | 94 |
| 9 | Unmarried | 3580 | 17.9 | 33.81 | 52.52 | 18.66 | 18 | 94 |
| 10 | Young | 1100 | 5.5 | 30.72 | 30.19 | 5.247 | 18 | 39 |
| 11 | Old | 2480 | 12.4 | 69.27 | 62.42 | 13.1 | 40 | 94 |
| 12 | Married | 7006 | 35.03 | 66.18 | 51.44 | 14 | 19 | 93 |
| 13 | Young | 1680 | 8.4 | 23.97 | 33.72 | 3.91 | 19 | 39 |
| 14 | Old | 5326 | 26.63 | 76.02 | 57.03 | 11.08 | 40 | 93 |

Add...  Insert...  Segment...  Edit...  Remove

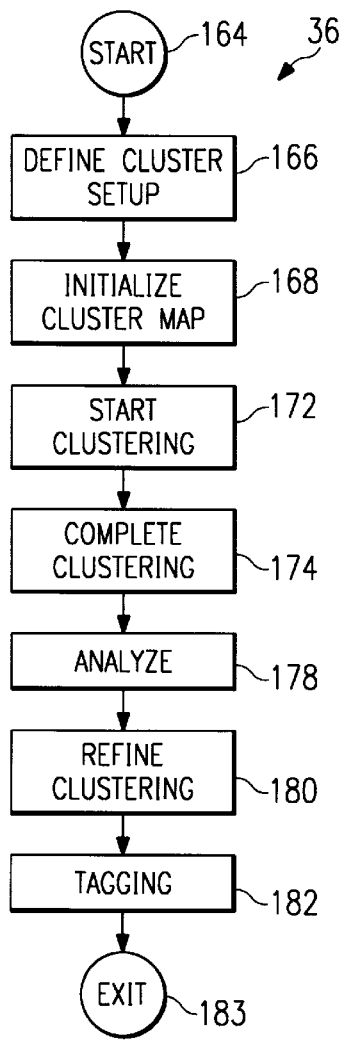
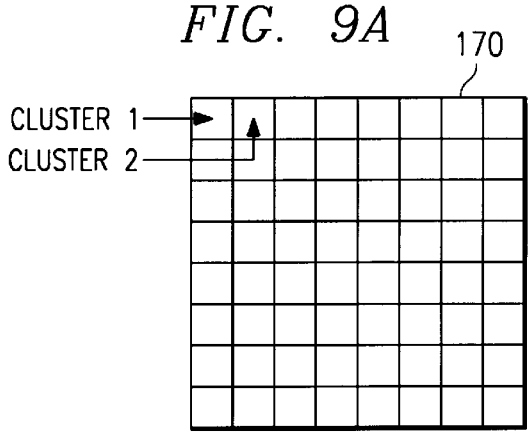
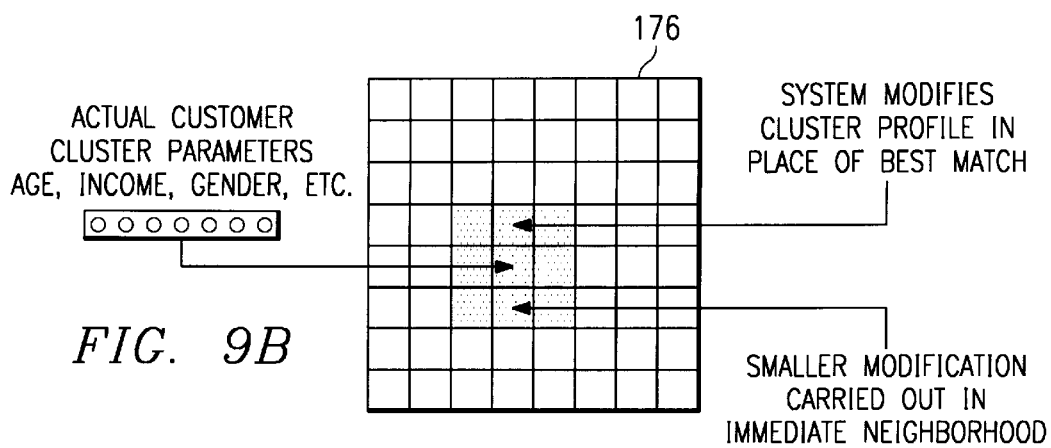

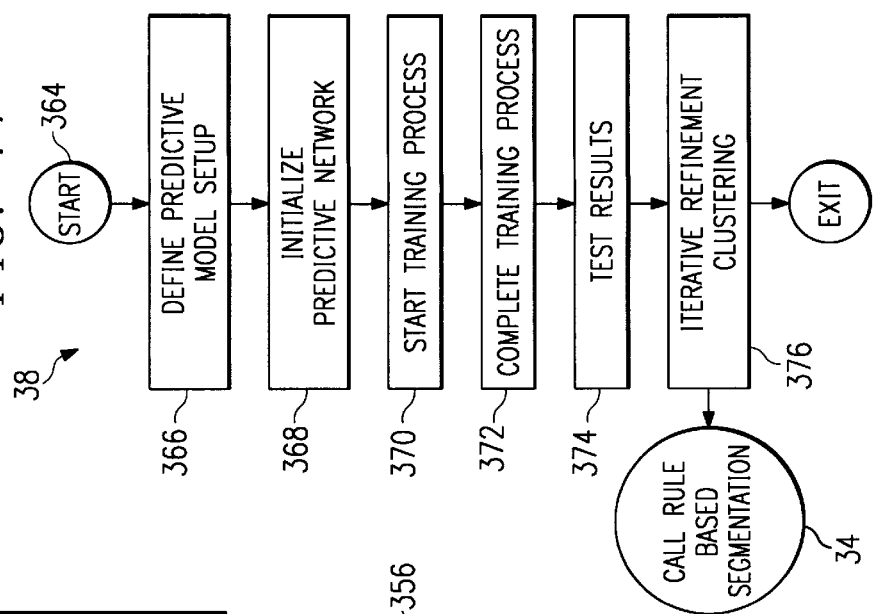
FIG. 17
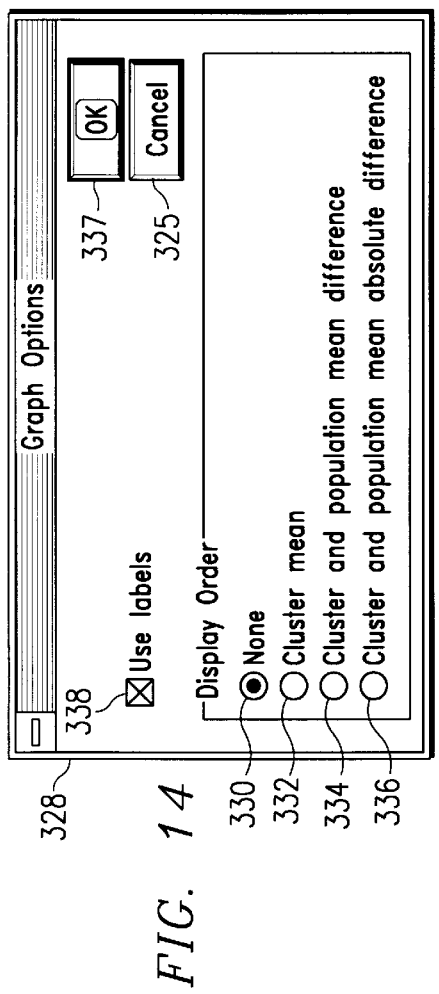
FIG. 14
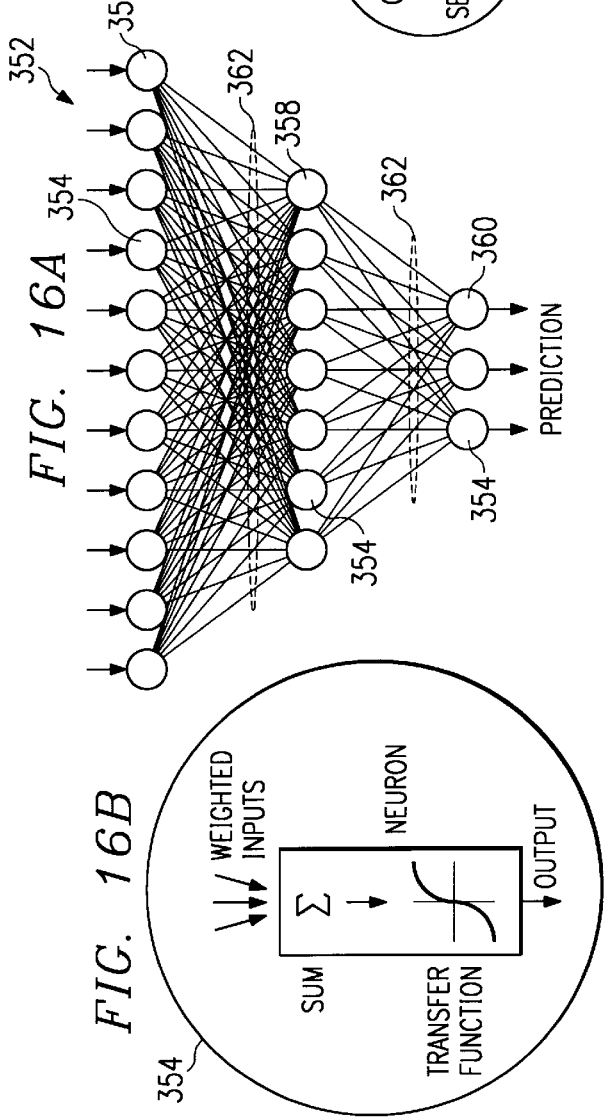
FIG. 16A
FIG. 16B

DATA ANALYSIS SYSTEM AND METHOD

TECHNICAL FIELD OF THE INVENTION

This invention relates in general to the field of data analysis, and more particularly to a statistical analysis system and method for analyzing data.

BACKGROUND OF THE INVENTION

In recent years advancements in technology have reduced the cost of computers to the point where nearly every event in one's day is recorded by a computer. Events recorded by computer are numerous and include, for example, every transaction made by an individual. Computers store the data associated with the transactions they process and this results in sometimes large database(s) of information.

The problem, therefore, arises of how to make efficient use of the tremendous amount of information in these database(s). When the number of records in a database rises to a sufficiently large level, simply sorting the information in the database provides no meaningful results. While statistical analysis of the records in a database may yield useful information, such analysis generally requires that persons with advanced training in math or computer science perform the analysis and understand the results of the analysis. Additionally, translation of the statistical analysis of the information in a large database into a form that may be useful for such activities as marketing is also difficult. Such a situation may prevent the effective use of the information in a database and preclude the use of a possible valuable resource.

SUMMARY OF THE INVENTION

In accordance with the present invention, a data analysis system and method are provided that substantially eliminate or reduce disadvantages and problems associated with previously developed data analysis tools.

One aspect of the present invention provides a system for analyzing a data file containing a plurality of data records with each data record containing a plurality of parameters. The system includes an input for receiving the data file and a data processor having at least one of several data processing functions. These data processing functions include, for example, a segmentation function for segmenting the data records into a plurality of segments based on the parameters. The data processing functions also include a clustering function for clustering the data records into a plurality of clusters containing data records having similar parameters. The clustering function can also generate cluster maps depicting the number of records in each cluster. A prediction function for predicting expected future results from the parameters in the data records may also be provided with the data processing function.

Another aspect of the present invention provides a system for analyzing a data file containing a plurality of customer data records, each data record contains a plurality of customer parameters. The system includes an input for receiving the data file and a data processor for processing the data records. The data processor includes a segmentation function for segmenting the customer data records into a plurality of segments based on the parameters. The data processor also includes a clustering function for clustering the customer data records into a plurality of customer groups having similar parameters. A prediction function for predicting customer behavior from the customer data records is also provided with the data processor.

Yet another aspect of the present invention provides a method for analyzing a data file containing a plurality of data records, each data record containing a plurality of parameters. The method further includes the steps of inputting the data file and processing the data file. Processing the data file includes at least one of segmenting the data records into a plurality of segments based on the parameters, clustering the data records into a plurality of clusters containing data records having similar parameters, and predicting expected future results from the parameters in the data records.

The present invention provides several technical advantages. One technical advantage of the present invention is that it provides a user-friendly computer system and method for performing statistical analysis on the information within a database.

Another technical advantage of the present invention is that it provides several statistical analysis tools within a single computer system. Each tool may be used to perform statistical analysis on the information within a database. Additionally, the results of the analysis from several tools may be combined for enhanced statistical data analysis.

Yet another technical advantage of the present invention is that it may be used to identify complex patterns and relationships within large quantities of information. By defining these patterns and relationships in, for example, customer information, targeted marketing or promotion activities may be developed.

An additional technical advantage of the present invention is that it may be used in developing a marketing program for identifying customers that are most likely to respond to the marketing program. Moreover, it may be used to profile customer groups to identify socio-demographic or behavioral characteristics within the customer groups. It also provides for identifying significant associations between customer behavior, lifestyle, or attitudinal features, and may be used to identify significant associations between customer purchase preferences.

Another technical advantage of the present invention is that it provides for segmenting records into logical groups.

Yet another technical advantage of the present invention is that it provides for clustering records into statistically significant groups.

Yet another technical advantage of the present invention is that it may be used to predict customer or potential customer behavior, including, for example, propensity to respond to direct mail or telemarketing, product preference, profitability, credit risk, and probability of attrition. The present invention also provides a technical advantage of identifying "unusual" customers and potentially fraudulent behavior by those customers.

BRIEF DESCRIPTION OF THE DRAWINGS

For a more complete understanding of the present invention and advantages thereof, references is now made to the following description taken in conjunction with the accompanying drawings in which like reference numbers indicate like features and wherein:

FIG. 4 illustrates a rule based segmentation window in accordance with one aspect of the present data analysis invention;

FIG. 8 is an exemplary flowchart for a neural clustering function available with the present invention;

FIGS. 9A and 9B illustrate a clustering process in accordance with the present system;

FIG. 14 depicts an exemplary graph options dialog box available with the neural clustering function of the present data analysis invention;

FIGS. 16A and 16B illustrate a multi-layer perception network and neuron, respectively, used in one embodiment of the neural prediction function of the present invention;

FIG. 17 illustrates an exemplary flowchart for the neural prediction function in accordance with the present invention;

FIG. 31 illustrates a data append operation in accordance with the present invention;

FIG. 32 depicts an exemplary data append window for use with a data append in accordance with the present invention;

DETAILED DESCRIPTION OF THE INVENTION

Preferred embodiments of the present invention are illustrated in the FIGUREs, like numerals being used to refer to like and corresponding parts of the various drawings.

Figure 1:
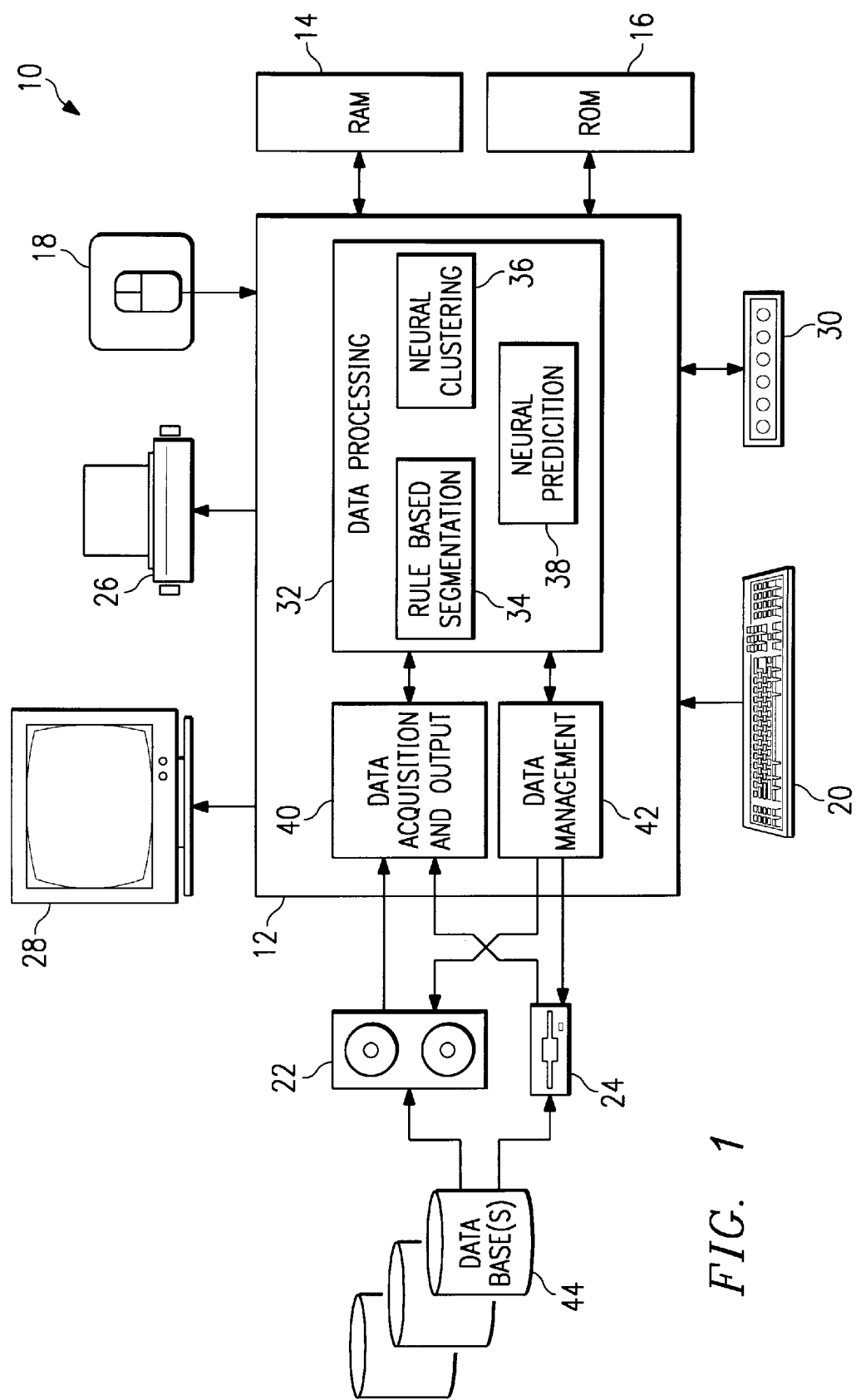
FIG. 1 shows an exemplary system for data analysis in accordance with concepts of the present invention.

FIG. 1 shows data analysis system 10 embodying concepts of the present invention. Data analysis system 10 preferably includes processor 12, random access memory (RAM) 14, read only memory (ROM) 16, pointing device 18, keyboard 20, and various output device(s). The output device(s) for system 10 may include, for example, external memory devices such as tape drive 22 and disk drive(s) 24, printer 26, and display 28. Data analysis system 10 also preferably includes modem 30 for making connections to external communication mediums. Data analysis system 10 is not limited to any particular hardware embodiment and may be implemented in one or more computer systems. Processor 12 in system 10 is adapted to execute many types of computer instructions in many computer languages for implementing the functions available data analysis system 10.

Data analysis system 10 in FIG. 1 provides an advanced statistical analysis tool for analyzing databases containing many different types of data. Although system 10 may be used for analysis of databases containing a variety of information, system 10 has been successfully implemented and has been found to be particularly useful in analyzing customer databases. Data analysis system 10 may provide significant benefits with its capability to identify complex patterns and relationships within large quantities of information. To that end, system 10 includes several functions. System 10 preferably includes data processor 32 that is supported by processor 12. Within data processor 32 are preferably rule based segmentation function 34, neural clustering function 36, and neural prediction function 38. Data processor 32 uses data acquisition and output function 40 and data management function 42 to receive and manipulate data in performing data analysis. Such data is typically found in one or more database(s) 44 that may be stored on tape drive 22 or disk drive(s) 24.

Data acquisition and output function 40 is responsible for receiving data from database(s) 44 and formatting the data for processing by data processor 32. In one embodiment of the present invention, data acquisition and output function 40 receives customer data in a flat ASCII format from database(s) 44 and converts it into a concise internal binary form for use by data processor 32. Data acquisition and output function 40 preferably includes a data dictionary function that allows for setting up and customizing parameter names for all of the parameters in a given database and will be described in discussions relating to FIG. 2.

Data management function 42 of data analysis system 10 allows for concatenating different sets of records, either different sets of records with the same data fields or different sets of fields for the same records. Data management function 42 allows for pruning out redundant records in a data set and converting binary records into an appropriate format for use by other systems.

Data processor 32 preferably includes several functions for performing data analysis. Rule based segmentation function 34 within data processor 32 preferably provides a mixture of query, segmentation, and statistical analysis capabilities. Rule based segmentation function 34 may provide a flexible and powerful facility for the investigation of data. Rule based segmentation function 34 may provide statistical information on each parameter in a data set for all records in the data set or for a given record segment. The segmentation tool also allows for splitting data into a set of hierarchically organized logical groups or tree structures. The segmentation process may be controlled by simple rules specified in "English-like" tests for each branch in the hierarchy. The segmentation logic in rule based segmentation function 34 is easy to understand and modify and can be interactively modified for further pruning or further segmenting of the records in a data set to create a structure of any degree of complexity. This segmentation capability, combined with a statistical analysis capability, provides an efficient, flexible, and interactive system and method for analyzing and partitioning large quantities of data.

Data processor 32 within data analysis system 10 also preferably includes neural clustering function 36. Neural clustering function 36 clusters records into statistically significant groups of similar records. This function can identify the characteristic profiles of the groups and ranks the defining parameters in accordance with significance and differences from the population average. This capability is a powerful and computationally efficient form of statistical clustering and provides a method of discovering discriminatory patterns and associations within large quantities of unexplored information. Previously unknown relationships in the data may be uncovered in data and expected relationships verified quickly and easily with neural clustering function 36 of the present invention.

Neural prediction function 38 within data processor 32 provides the capability to predict future behavior or relationships of the items represented by a particular data set. Using a statistical machine learning technology that has the ability to learn from historical behavior stored in a database, neural prediction function 38 can be used to predict many aspects for behavior for which records or historical behavior are held in a data set.

While data processor 32 shown in FIG. 1 includes rule based segmentation function 34, neural clustering function 36, and neural prediction function 38 the present data analysis system and method is not limited to these functions. Some embodiments of the present invention may include only one of these functions while other embodiments may include additional functions not shown in FIG. 2. The number and type of data processing functions in system 10 may therefore be varied without departing from the spirit and scope of the present invention.

Data analysis system 10 may be used to analyze database(s) of information of many types and is not limited to any particular database content. Data analysis system 10 is particularly beneficial in analyzing customer databases that include information on the types of products purchased, frequency of purchase, quantity of purchase, and other general information on customers, e.g., age, gender, marital status, etc. An example of such a database is the demographic and lifestyle database available from NDL International Ltd. In further describing data analysis system 10, reference will be made to customer databases, but these references are not intended in a limiting sense as the present data analysis system may be used for analyzing many different databases of information without departing from the spirit and scope of the present invention. One embodiment of data analysis system 10 is available from Electronic Data Systems Corporation under the trade name AcuSTAR.

As a first step in using data analysis system 10 in FIG. 1, a input data set or file may be retrieved from database(s) 44 stored in tape drive 22 or disk drive(s) 24. As previously stated, data acquisition and output function 40 of system 10 provides the necessary data input capability to convert raw data in database(s) 44 into a form that can be used by data processor 32. In one embodiment of data analysis system 10, data in database(s) 44 is in ASCII data flat file format. This means that the data is provided in the form:

```
Record 1 a b c d . . .
Record 2 a b c d . . .
Record 3 a b c d . . .
```

Data in this format may be presented in typically one of three ways: single-spaced separated, comma-separated, or tab-separated format.

In inputting the data in database(s) 44, data acquisition and output function 40 converts input data in raw text files to an appropriate binary format. In one embodiment of system 10, function 40 maps numeric columns in a text file to parameters in a binary data file. Data files input by data acquisition and output function 40 may be used by data processor 32 of data analysis system 10.

Figure 2:
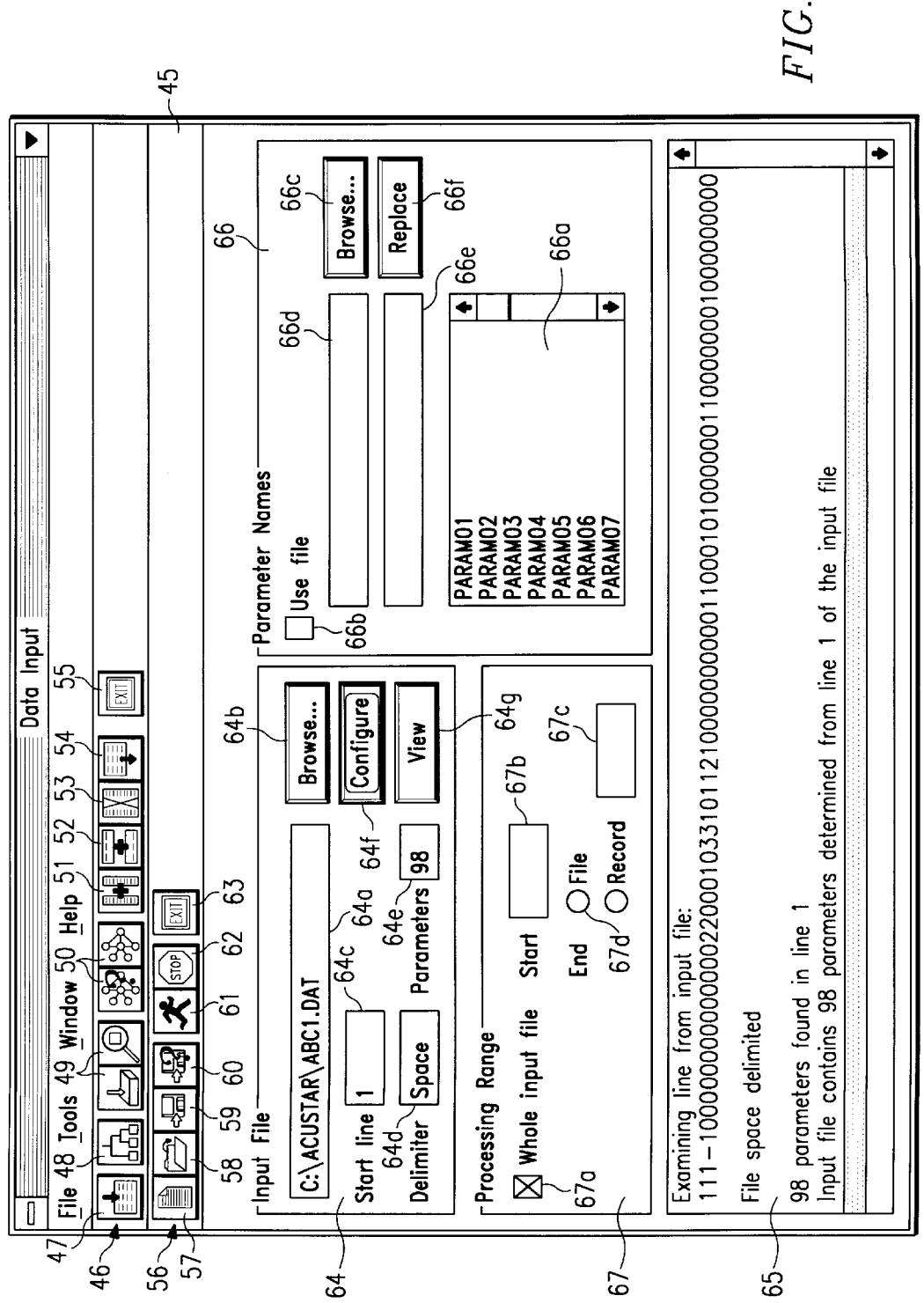
FIG. 2 is an exemplary data input window for use with the present invention.

FIG. 2 illustrates an exemplary data input window 45 that provides a graphical input screen for retrieving and converting a data file from database(s) 44 into a format that may be used by data analysis system 10. Processor 12 generates window 45, as well as all other windows described hereinafter, on display 28 using standard graphical user interface (GUI) protocols and techniques.

FIG. 2 also illustrates main toolbar 46 that is generally available with the windows provided by data analysis system 10. Toolbar 46 provides access to the functions available within data analysis system 10 of the present invention. The buttons in main toolbar 46, as well as all other buttons described hereinafter, may be selected and activated using standard "select and click" techniques with pointing device 18 and display 28. The number and design of the buttons shown for toolbar 46 in FIG. 2 are exemplary of the buttons that may be included with toolbar 46. The numbered design of the buttons may be modified as necessary without departing from the spirit and scope of the present invention.

Main toolbar 46 includes data input button 47 that may be selected to access the data input capability of data acquisition and output function 40. Rule base segmentation button 48 may be selected to access rule based segmentation function 34. Clustering buttons 49 may be selected to access neural clustering function 36. Prediction buttons 50 may be selected to access neural prediction function 38. Data merge button 51 may be selected to access a data merge capability within data management function 42. Data append button 52 provides access to a data append function within data management function 42. Data paring button 53 may be selected to access a data paring capability within data management function 42. Data output button 54 may be selected to output a data file via data acquisition and output function 40 once the results of the processing of a data file with data processor 32 are complete. Also, within main toolbar 46 is exit button 55, which may be selected at any time to exit data analysis system 10.

Data input window 45 in FIG. 2 also includes data input toolbar 56. Toolbar 56 includes initiate new input configuration button 57, open existing input data configuration button 58, save data input configuration 59, save data configuration as button 60, run data input function button 61, stop data input button 62, and close data input function button 63. The buttons in toolbar 56 provide a simple method for entering standard commands when inputting a data file.

Data input window 45 in FIG. 2 preferably includes input file section 64. Input file section 64 includes input file name field 64a and browse button 64b that may be selected to view a list of available input files. Input file section 64 also preferably includes start line field 64c that specifies the line in the input file where data begins. Delimiter field 64d identifies the type of delimiter used in the input file, and parameters field 64e indicates the number of parameters in the input file. By selecting configure button 64f in input file section 64, data acquisition and output function 40 will attempt to read the format of the selected data file to complete the information in start line field 64c, delimiter field 64d, and parameters field 64e. Selecting view button 64g in input file section 64 displays in message section 65 of window 45 the first several records in the input data file. An example of the type of data to be provided in message section 65 is shown in FIG. 2.

Data input window 45 also includes parameter name section 66 that allows for associating a textual identifier, i.e., a name, with each column of data in the input data file. In one embodiment of the present invention, a default name is given to each column of data in the form of PARAMOON, where N is the Nth data column. Parameter names can be generated in at least two ways, either from a parameter name file, which includes a name for each data parameter, or via keyboard 20. An example of this is illustrated in parameter name list section 66a show in FIG. 2. In order to use a file for the names of the parameters in the input file, use file checkbox 66b is selected, and by selecting browse button 66c a dialogue window will be produced for selecting a file from a preexisting list of files. The selected file for the parameter names for the input file appears in file name field 66d.

Alternatively, parameter names for the input file may be created with keyboard 20. In this alternate method, each default parameter name is selected in parameter name list section 66a and a new name may be entered in new name field 66e with keyboard 20 and accepted by selecting replace button 66f.

Data input window 45 in FIG. 2 also preferably includes processing range section 67 that allows for specifying whether the whole or only a portion of the input file is to be processed. To process the entire input file whole input file checkbox 67a is selected. Alternatively, if only a portion of the input file is to be processed, a start record may be input to start field 67b and an end record may be input to end field 67c. To process to the end of the input file, end file checkbox 67d may be selected.

Using the input function of data acquisition and output function 40, a data file in database(s) 44 can be processed appropriately for further use with data analysis system 10.

Figure 3:
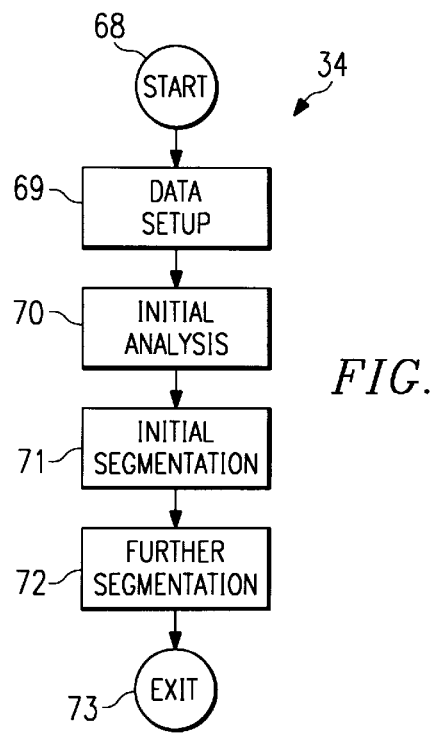
FIG. 3 is an exemplary flowchart for rule based segmentation in accordance with the present invention.

FIG. 3 shows an exemplary flowchart for rule based segmentation function 34 of data analysis system 10. As previously noted, rule based segmentation function 34 allows for applying flexible rule based segmentation techniques to organize data hierarchically. When operating on customer databases, rule based segmentation function 34 provides for market segmentation and customer scoring. By applying a number of logical tests on the data, which may be nested upon each other, the data may be split into different segments. Statistics on the data, e.g., occupancy, mean, and minimum and maximum values for each segment may then be examined, histograms may be plotted, and these results may be analyzed.

One embodiment of rule based segmentation function 34 in accordance with the present invention has three main functions. The first function provides for subdivision of database records, e.g., customer population into a hierarchy of logical segments. The second function provides for identification of high level statistics for each segment, and the third provides for identifying detailed statistical distributions for each segment.

In FIG. 3 rule based segmentation function 34 begins at step 68 whenever, for example, rule based segmentation button 48 on main toolbar 46 is selected. At step 69 the data to be analyzed with rule based segmentation function 34 is appropriately formatted as described in discussions relating to FIG. 2. Proceeding to step 70 an initial analysis of the data may be accomplished that provides basic statistics on the data file, including, for example, a mean, standard deviation, and minimum and maximum values for each field in the data file.

Next, at step 71 in rule based segmentation function 34 as depicted in FIG. 3, initial segmentation of the data file may be accomplished. For example, when dealing with a customer database it may be desirable to segment customer records into married and non-married customers. To do this, a user simply defines a two branch segment to be created from the total population of records, the first branch on this segment being defined by the rule "MARRIED=0" with the second segment having all remaining non-married customers.

Once the initial segmentation at step 71 is complete, expanding the initial segmentation is possible. This is a simple process with rule based segmentation function 34 of data analysis system 10 of the present invention and is accomplished by moving to any point in an existing segment and either inserting or removing branches on that segmentation level to a further level. Examples of further segmentation in accordance with step 72 in FIG. 3 will be described in discussions relating to FIG. 4. Once the further segmentation at step 72 is complete, statistics on any parameter for all segments or for comparing the parameters distribution between any two segments may be viewed on display 28. Once the desired segmentation is complete, rule based segmentation function 34 is exited at step 73.

Rule based segmentation function 34 may be used for several purposes that include, for example, selectively partitioning the data for more manageable analyses, examining trends in the data, gaining an intuitive feel for the content of the data, excluding rogue samples in the data from being included in any predictive or clustering models, examining the results of neural clustering function 36, e.g., occupancy and profile of a particular set of clusters, and examining the output and distribution from neural prediction function 38.

FIG. 4 shows an exemplary rule based segmentation window 74. Window 74 preferably includes toolbar 80 containing several buttons for providing predetermined commands within rule based segmentation function 34. Rule based segmentation toolbar 80 includes initiate new input configuration button 82, open existing configuration button 84, save data input configuration button 86, and save data input configuration as button 88.

Rule based segmentation toolbar 80 includes run button 90 and stop button 92. Toolbar 80 also preferably includes display summary file button 94 that may be selected to display a summary on a completed segmentation run on a given data set. Histogram plotter button 96 in toolbar 80 may be selected to prepare histograms for the segmentation configuration on a given data set. Also, rule based segmentation toolbar 80 includes exit button 98, which may be selected at any time to exit rule based segmentation function 34.

Rule based segmentation window 74 as shown in FIG. 4 also includes segmentation results section 100 providing an example of a segmentation run on a data file. Section 100 includes information on the segment number (Bin), segment test (Test Name), size of the segment (Size), percent of the total segment (%Total) percent of the Parent Segment (%Parent), mean for the segment (Mean), the segment's standard deviation (SD), minimum value for the segment (Min), and the maximum value for the segment (Max). In the example shown in FIG. 4, the data file includes 20,000 records as indicated by the Size for All Records Bin 0.

A file may be selected for segmentation with rule based segmentation 34 by selecting setup button 102 in window 74. Selecting setup button 102 activates rule based segmentation setup window 104 shown in FIG. 5.

Figure 5:
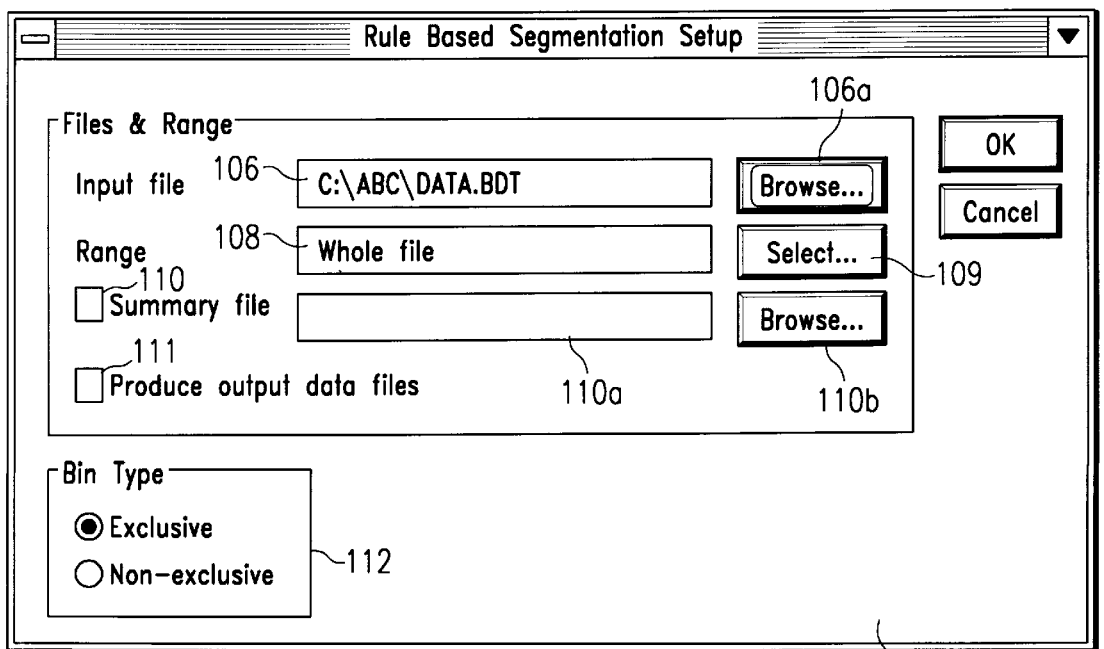
FIG. 5 shows a rule based segmentation setup window for use with the present invention.

FIG. 5 shows an exemplary rule based segmentation setup window 104 for selecting a file for processing in rule based segmentation function 34. Window 104 allows for specifying the input file for processing in input file field 106. A listing of available data files may be accessed by selecting browse button 106a. The portion or range of the file to be processed may be specified in range input field 108. Select button 109 may be chosen to select a range within the input file to be processed.

Window 104 also preferably includes summary file checkbox 110, which may be selected to generate a summary file for the segmentation process. The summary file name may be input to summary file name field 110a, and a list of potential summary file names may be viewed by selecting browse button 110b. Window 104 also includes produce output data files checkbox 111, which when selected, causes rule based segmentation function 34 to create output data files containing the results of the segmentation process. As shown in the example of FIG. 5, the file in input file field 106 is "C:\ABC\DATA.BDT," and the range for scanning this file in range input field 108 is the "Whole file."

Dialogue box 104 in FIG. 5 also includes bin type selection 112. In segmenting the data in a data file with rule based segmentation function 34, the records in the data file are sorted into segments or bins. These bins may be exclusive or non-exclusive. The default bin type calls for exclusive bins. Exclusive bins are completely separate in terms of membership. Therefore, with exclusive bins, each member of a data file can only be in one bin. Alternatively, when using non-exclusive bins, individual members can occupy one or more bins.

In rule based segmentation function 34, each level of segmentation may include an arbitrary number of bins. This is achieved by defining a logical test for each bin, except for the remainder bin, which contains all members that do not fall within the other specified bins. The remainder bin can be renamed at any time, saved to a file, or segmented further, however, preferably should not be deleted.

Several actions may be performed on bins in rule based segmentation function 34. For example, a name may be defined for each bin using a string of characters. A logical test for the bin may be specified. A bin may be saved to a file for use in later analysis. Also, bins at the same level may be added together, and another bin at the same level may be inserted before the current bin. Bins may be segmented further and a bin may be deleted along with all of its "dependent bins," except for the remainder bin.

As previously noted rule based segmentation window 74 includes segmentation results 100 showing the results of a segmentation configuration applied to a particular data set. The example segmentation shown in FIG. 4 includes 14 bins. Bin 0 is the "All Records" bin and contains all members of the data set. All segmentation of the data set is therefore performed on Bin 0. The levels of segmentation are indicated in segmentation results 100 by bin number and test name with bins at the same level being tabbed over the same distance under Bin 0 All Records. Therefore, in the example shown in FIG. 4, the All Records bin was initially segmented into Bin 1 "Male" and Bin 8 "Female". From these initial segmentation levels, the male and female bins were further segmented into "Unmarried" and "Married" bins, which in turn were each further segmented into "Young" and "Old" bins.

For each bin in window 74 the number of members in that bin is shown in the "Size" column. The percentage the number of members in a particular bin represents with respect to the total number of records is shown in the "%Total" column. For those bins having "parent-bins," i.e., all bins in the example of FIG. 4 except Bin 0 All Records, the percentage the bin represents with respect to its parent bin is shown in the "%Parent" column. For each bin the "Mean", standard deviation ("SD"), and minimum (MIN) and maximum (MAX) values are provided in segmentation results 100.

Rule base segmentation window 74 also includes parameter pop-up field 114, which may be used to select the parameter that segmentation results 100 is based on. Therefore, in the example of FIG. 4 the parameter "AGE" and its attendant statistics based on the specified segmentation are shown in segmentation results 100. Parameter pop-up field 114 may be used to select the other parameters in the data set for performing a new segmentation on the data set.

Rule based segmentation window 74 also preferably includes action buttons 116 that may be used to perform predetermined actions on the particular bin or bins of a segmentation. Once an existing bin is selected, selecting add button 118 allows adding another bin after the selected bin at the same level of the selected bin. Insert button 120 performs the same function as add button 118 except that the new bin is introduced before the selected bin at the same level as the selected bin. Selecting segment button 122 creates a "child-bin" at the next level of indentation from the selected bin. Activating remove button 126 removes the selected bin.

Action buttons 116 in rule based segmentation window 74 also include edit button 124, which may be used to edit a selected bin or segment. The add, insert, segment, and edit bin operations are all very similar, and an example window for editing a selected bin in response to the selection of edit button 124 is shown in FIG. 6 and is representative of the windows provided when add button 128, insert button 120, or segment button 122 are selected.

Figure 6:
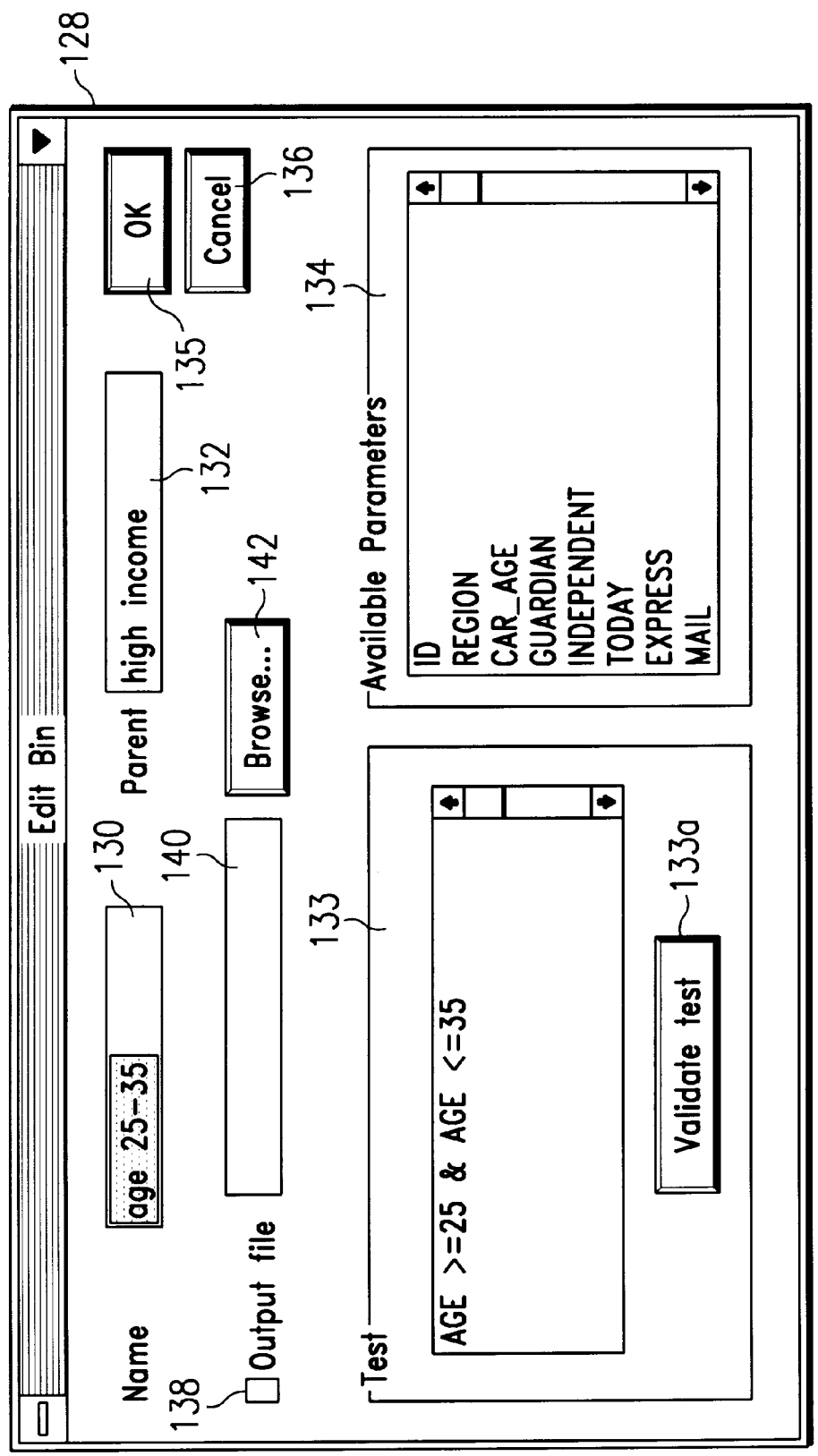
FIG. 6 illustrates an exemplary window for editing a bin within the rule based segmentation function of the present data analysis invention.

FIG. 6 shows an exemplary edit bin window 128 that may be used for editing a bin used with rule based segmentation function 34. Window 128 includes bin name field 130 as well as parent bin name field 132. Therefore, in the example window shown in FIG. 6, the bin being edited is the bin named "ages 25–35" that is a child-bin of a bin named "high income." Edit bin window 128 in FIG. 6 also preferably includes bin test field 133, which shows the test for the bin being edited. Appropriately, for the bin named "age 25–35" the test in field 133 is "AGE>=25 & AGE<=35." A test in test field 133 may be validated by selecting validate test button 133a.

Edit bin window 128 also includes available parameters section 134, which shows all the available parameters that may be used in defining or editing a bin. Once the edits to a bin are complete, OK button 135 may be selected to accept the specified edit. Alternatively, the edits to a particular bin may be canceled at any time by selecting cancel button 136.

Also, edit bin window 128 includes output file checkbox 138, which may be selected to output the contents of a particular bin to a file. The file name to which the bin's contents are to be output may be specified in output file name field 140. Alternatively, browse button 142 provides a predetermined list of files to which the segment's contents may be stored.

In specifying the test for a bin using rule based segmentation function 34 of data analysis system 10, standard logic may be used. See, for example, the test shown in test field 133 in FIG. 6. Table 1 below illustrates and example operator set for logical and relational operators for developing tests for segmentation bins. Operators are shown in descending precedential order.

TABLE 1

| OPERATOR | FUNCTION |
| --- | --- |
| ( | parenthesis |
| ) | parenthesis |
| < | less than |
| <= | less than or equal |
| > | greater than |
| >= | greater than or equal |
| = | equal |
| != | not equal |
| ! | logical not |
| & | logical and |

Figure 7:
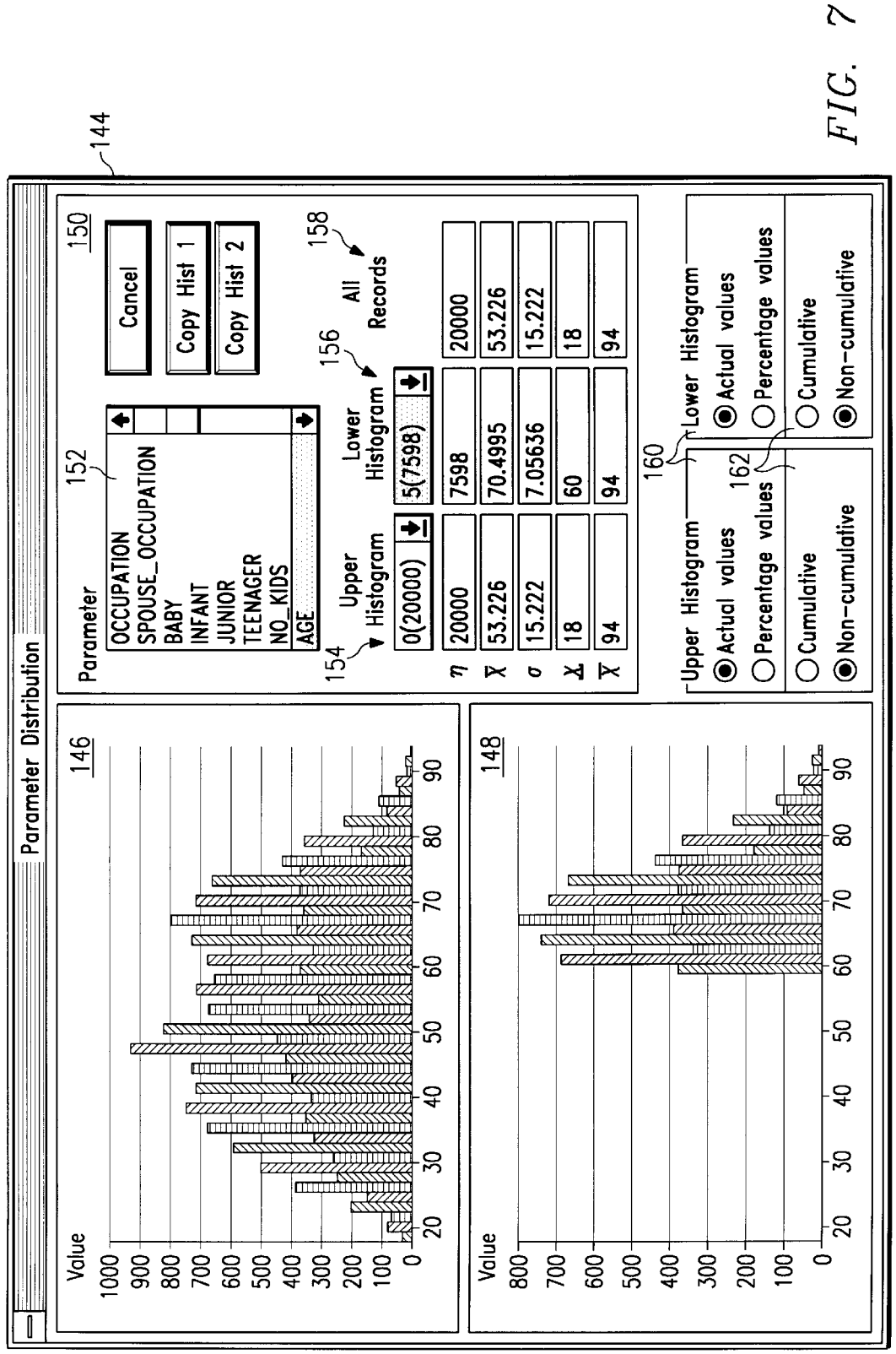
FIG. 7 depicts an exemplary of a parameter distribution window including histograms available with the rule based segmentation function in accordance with the present invention.

FIG. 7 shows an exemplary parameter distribution window 144 available with rule based segmentation function 34 of data analysis system 10. Once the desired bins for a particular segmentation have been established and applied to a data set, a histogram plot of the data may be generated by rule based segmentation function 34 as shown in FIG. 7. By selecting histogram plot button 96 in toolbar 80 of rule based segmentation window 74, parameter distribution window 144 shown in FIG. 7 is provided.

FIG. 7 illustrates parameter distribution window 144 having two histogram regions, including histogram region 146 and histogram region 148. Window 144 also preferably includes parameter information 150 that includes parameter list 152, which provides a list of parameters that may be plotted in the histograms of window 144 and that indicate by shading the name of the parameter that has been selected for depiction in histograms 146 and 148. In the example of FIG. 7, the parameter "AGE" has been selected for plotting on the histograms.

Parameter information region 150 also includes upper histogram information 154, lower histogram information 156, and all records information 158. Histogram informations 154 and 156 and all records information 158 in turn include information on the number ($\eta$) of records the average $\overline{\chi}$, the standard deviation ($\sigma$) and the minimum ($\chi$) and maximum ($\tilde{\chi}$) value for the data set. In the example shown in FIG. 7, upper histogram 146 illustrates the distribution of members within a 20,000 member class having a minimum age of 18 and a maximum age of 94. The lower histogram 148 illustrates the distribution for the same data set but having a minimum age of 60 and a maximum age of 94. This different minimum age accounts for the difference between histograms 146 and 148 and histogram informations 154 and 156.

Histograms 146 and 148 in parameter distribution window 144 can be plotted as actual values or percentage values by an appropriate selection in values regions 160. Also, histograms 146 and 148 may be plotted with cumulative or non-cumulative distribution by an appropriate selection in distribution regions 162.

Histograms 146 and 148 in window 144 may be plotted and printed using color coding as well as shading as shown in FIG. 7. Histograms 146 and 148 can be saved as bit maps so that they may be imported into other programs, e.g., word processing, graphics, or spreadsheet programs.

FIG. 8 provides an exemplary neural clustering function 36 in accordance with the present invention. Data analysis system 10 preferably uses unsupervised learning neural network techniques to cluster data from a data file or from specific segments in a data file to identify groups with similar characteristics. Neural clustering function 36 also provides a generic profiling capability. Neural clustering function 36 is different from the segmentation provided with rule based segmentation function 34 in that the clustering is based entirely on the statistics of the data rather than specified logic. This contrasting analysis of a data set provides for alternate views of the data set. The results of neural clustering function 36 may be displayed graphically on display 28 in an easy to understand format. Information on the distribution of parameters for records in a particular cluster may be viewed and relationships between parameters may be identified. Neural clustering function 36 may also be used to identify unusual data so that it may be examined in more detail.

Neural clustering function 36 begins at step 164 when, for example, clustering buttons 49 in main toolbar 46 described in discussions relating to FIG. 2 are selected. At step 166 a cluster setup is defined. This may be accomplished by defining the fields in the clustering process. For example, when the data file contains customer information, the cluster parameters may be age, gender, income, or whatever parameter is desirable. Also, the maximum number of clusters should be defined at step 166. The number of clusters is preferably a square number, e.g., 3×3, 4×4, 5×5, . . . .

The next step in neural clustering function 36, as represented in FIG. 8, involves initializing the cluster map at step 168. Before the actual clustering process may commence, neural clustering function 36 preferably automatically prepares a random set of "generic records" and assigns one record to represent each cluster. Continuing the customer data example, these "generic records" would be "generic customers." Each "generic record" has a set of cluster parameters that are randomly generated. Neural clustering function 36 generates the clusters randomly in a two-dimensional grid or cluster map as shown in FIG. 9A that is an 8×8 cluster map. Cluster 1 and Cluster 2 have been randomly identified in cluster map 170 for a particular (undefined) set of parameters. It is noted that neural clustering function 36 is not limited to using an 8×8 map as shown in FIGS. 9A and 9B. Maps of other sizes may be used without departing from the spirit and scope of the present invention.

Returning to neural clustering function 36 in FIG. 8, at step 172 the clustering process is started. In starting the clustering process, neural clustering function 36 takes the first record in the database, identifies the generic cluster that is most similar to that record and then modifies that cluster to provide a closer match to the actual record. In one embodiment of neural clustering function 36, an Euclidian distance is used as the matching metric between an input record and a "generic record" cluster. Neural clustering function 36 also modifies the clusters in the immediate neighborhood to the chosen cluster to make them more similar to the chosen cluster. This process is illustrated in FIG. 9B in cluster map 176.

Returning to FIG. 8, at step 174 in neural clustering function 36 the clustering process is completed. In doing so, function 36 takes each successive record, identifies the best match in the cluster map, and, as before, modifies the cluster in its immediate neighborhood, as shown in FIG. 9B. This process may be repeated a number of times on the total data set with the degree of modification and size of neighborhood modified in the cluster map gradually reducing as the training proceeds. The result of this is that neural clustering function 36 initially coarsely separates the customers into major groups in different parts of the cluster map. Function 34 then progressively defines these major groups into further groups having more subtle distinct characteristics.

Neural clustering function 36 may also have a self-organizing capability in that, at the end of the clustering process, two clusters next to each other on a cluster map will have a high degree of similarity, while clusters on totally different parts of the map will be quite different. It should also be noted that a cluster map has no edges, and that the cluster cell on the top edge of the map is actually adjacent to one on the bottom edge, and the same is true for cells on the left and right edges of the cluster map. The cluster map is therefore a torroidal surface.

Returning to FIG. 8, the next step in neural clustering function 36 is step 178 where the results of the clustering process are analyzed. Once the clustering process is complete at step 174 a variety of analysis results are available with neural clustering function 36. One type of result available is cluster occupancy. This indicates the number of members in each cluster. This may be presented by color coding the cluster map with, for example, red clusters denoting high occupancy (large number of members) and blue clusters having low occupancy (small number of members).

Another type of result available with neural clustering function 36 is the mean, standard deviation, and minimum and maximum values for any parameter for each cluster. This may also be accomplished by color coding a cluster map. By selecting different parameters for display on a color-coded cluster map, changes in the color of the cluster map as the selected parameter changes allows for visualizing the distribution of members for each parameter.

The next level of results preferably available with neural clustering function 36 allows for viewing the mean, minimum and maximum values for any selected parameter for a single cluster and to compare these values with population averages. The parameters may also be ranked in terms of mean value. Also, a view of the complete distribution of any parameter for any cluster may be provided, and distributions between clusters or between one cluster and the total population may be compared.

Once analyze step 178 is complete, the clustering process may be refined at step 180. In the customer database example, refining the analysis of the clusters may provide information about the customers, the major customer groups, the profiles of those customers, the differentiating factors of the groups, and any significant associations between the defining factors of each group. Based on this it may be desirable to recluster the data, possibly using a different set of variables, a coarser or finer map, or using a subset of the original data.

The next step in neural clustering function 36 as represented in FIG. 8 is tagging step 182. One of the goals of neural clustering function 36 is to produce a set of statistical significant record groups, each with an intuitively sound profile but with exploitable behavioral characteristics. In the customer database example, clustering on demographic information such as age, income, gender, occupation, time in residence, etc., will produce a set of customers with similar demographic profiles. It is invariably the case, however, that these customer groups will have different lifestyle, attitude, and behavioral characteristics. In particular, certain clusters may have significantly higher than average propensity to respond to direct marketing material for a specific product. This can be exploited by ranking the clusters in terms of "propensity to respond" in targeting individuals whose profiles match the highest scoring groups. This may be accomplished at tagging step 182 of neural clustering function 36. Once tagging step 182 is complete, neural clustering function 36 may be exited at step 183.

Figure 10:
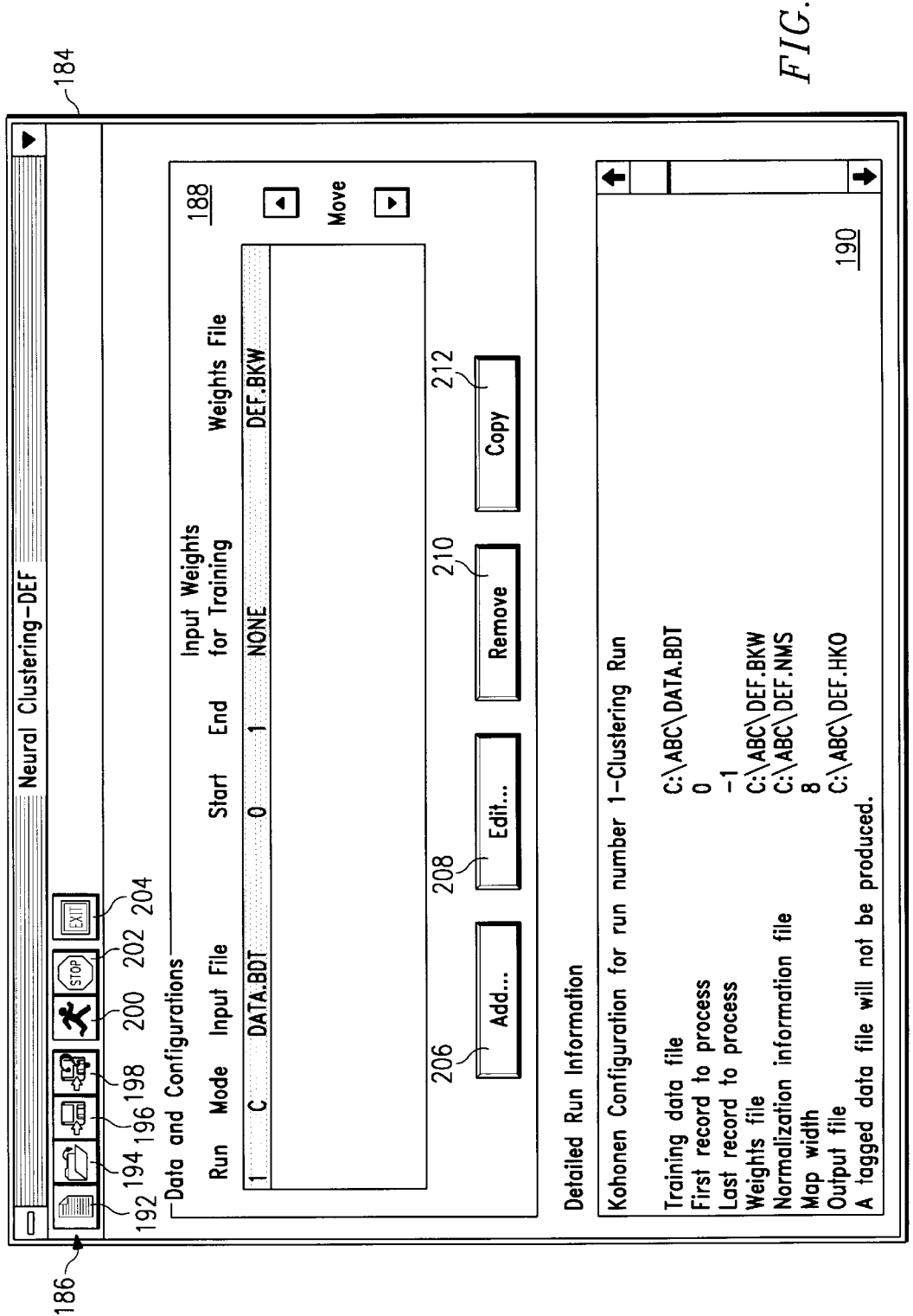
FIG. 10 illustrates an exemplary neural clustering window for use with the neural clustering function available with the present data analysis system.

FIG. 10 shows an exemplary run neural clustering window 184 for use with neural clustering function 36 in accordance with the present invention. Window 184 preferably includes toolbar 186, data and configurations section 188, and detailed run information section 190. Toolbar 186 includes initiate fresh network configuration button 192, retrieve network configuration button 194, save data input configuration button 196, and save data input configuration as button 198. Toolbar 186 also includes run clustering process button 200 and stop clustering process button 202. Additionally, toolbar 186 includes exit button 204 for exiting neural clustering function 36.

Data and configuration section 188 in run neural clustering window 184 provides information on each clustering run. An existing configuration file may be loaded or modified using retrieve network configuration button 194 in toolbar 186. In the example show in FIG. 10, file "DEF.CNC" is being processed with neural clustering function 36. Data and configurations section 188 indicates that input file "DATA.BDT" is being used for the clustering process, that the first "Run" has been completed and that the clustering mode is clustering ("C") (training) mode. Also, in the example of FIG. 10 the "Input Weights for Training" is "none" indicating that the run is not a continuation of previous clustering sessions. Data and configurations section 188 also includes information on the "Weights File" for a given clustering process, and in the example shown in FIG. 10 the "Weights File" is "DEF.BKW." This file is used for weighting purposes during a clustering run.

A new clustering configuration may be created with run neural clustering window 184 using add button 206, edit button 208, remove button 210, and copy button 212 in data and configurations section 188. If an existing configuration is not used for generating a new run, then an entirely new clustering specification must be generated. Neural clustering function 36 provides an appropriate window for setting up a new run via add button 206.

Figure 11:
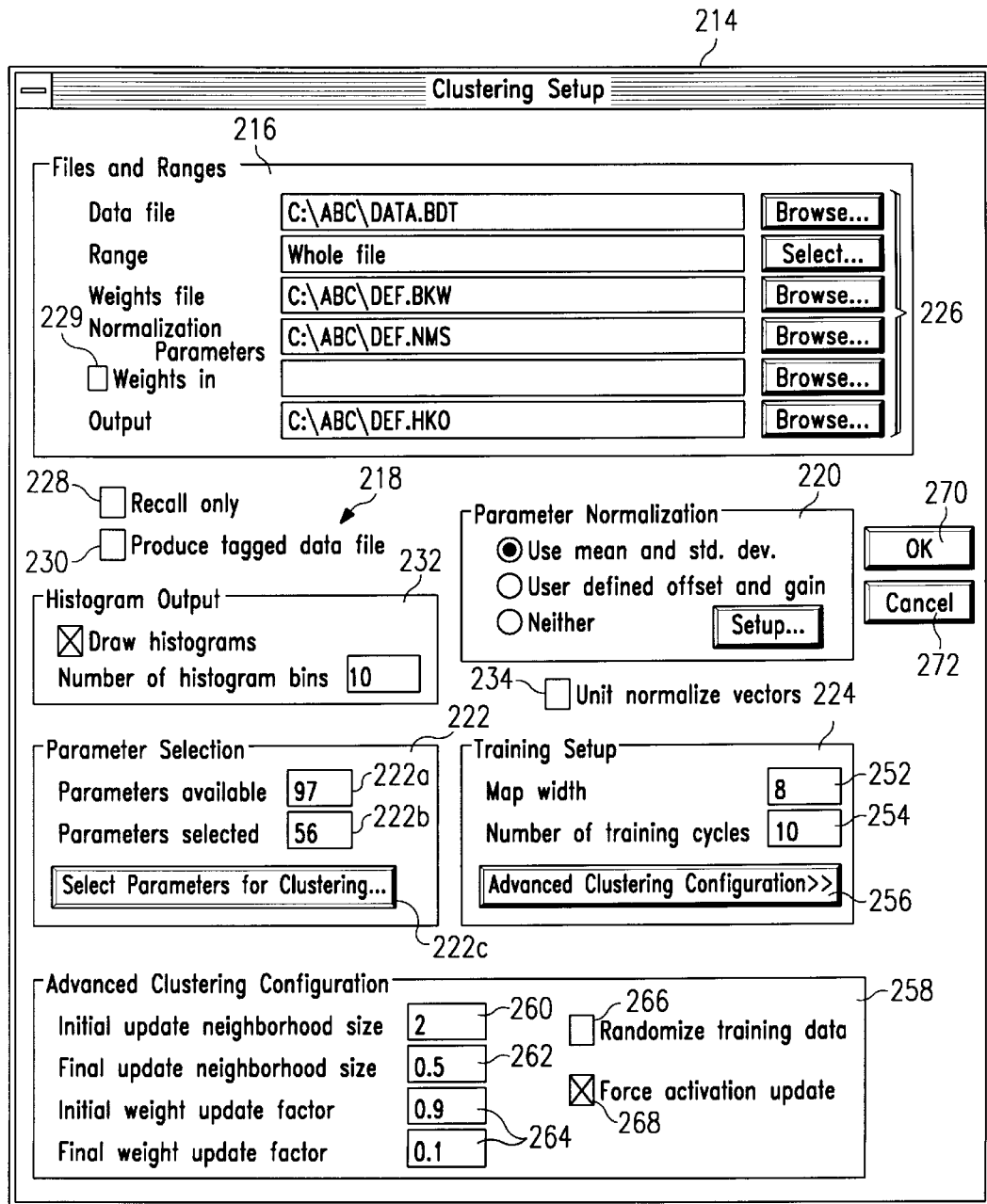
FIG. 11 shows an exemplary dialog window for setting up a neural clustering run in accordance with the present data analysis invention.

FIG. 11 illustrates an exemplary clustering setup window 214 for setting up clustering parameters in accordance with neural clustering function 36. Clustering setup window 214 preferably includes files and ranges section 216, output parameter section 218, parameter normalization section 220, parameter selection section 222, and training setup section 224.

Inputs to the various fields in files and ranges section 216 are available through browse and select buttons 226. Each browse button pulls up a dialogue box having a list of files for selection. The select button pulls up a dialogue box that offers choices as to the range of processing for a file. The processing range may be either the entire file or a specified start and end location.

Output parameter section 218 includes recall only checkbox 228 and produce tagged data file checkbox 230. When recall only checkbox 228 is selected, neural clustering function 36 runs in "recall mode", i.e., using a cluster model created earlier. A new set of data records may then be applied to an existing cluster map to see how the records correlate with an existing model. Additionally, weights in checkbox 229 in files and ranges section 216 should be checked when the clustering process is run in recall mode.

Selecting produce tagged data file checkbox 230 in output parameter section 218 causes neural clustering function 36 to produce a data file containing all the original information in the data file together with an additional field containing the cluster identification for each record. Even when recall only checkbox 228 is not selected, neural clustering function 36 performs a single recall run and at the end of the allotted number of training cycles to determine the cluster for each record. This corresponding data file may then be used in rule based segmentation function 34 to select particular clusters that have desirable features.

Additionally, whenever a neural clustering run is performed, neural clustering function 36 may produce a textual summary file containing, for example, cluster versus parameter information. The file typically has a header followed by four main sections containing mean, standard deviation, and minimum and maximum data, respectively. Also each row in the file may contain a "used" flag indicating whether the parameter was used as an input to the clustering process, followed by the mean value (or the standard deviation, etc.), for each cluster. The file may be single comma delimited, and the numbers in the file may be output to six significant figures. The file should also preferably be formatted so that it can be easily read into other applications such as, for example, spreadsheet applications.

Histogram output section 232 in clustering setup window 214 provides a checkbox for the creation of histograms for each parameter in each cluster. This information is calculated during the clustering run and stored in a separate file so that during analysis the distribution of parameters across the cluster map may be viewed and analyzed in a graphical manner.

Parameter normalization section 220 in clustering setup window 214 preferably provides three parameter normalization options. Normalization rescales the parameters so that they all have the same dynamic range, e.g., minimum or maximum values. If the data is not normalized prior to processing, and some parameters have a large range of values, these values may dominate the processing and produce erroneous results.

One of the normalization options in section 220 is a "use mean and standard (std.) deviation (dev.)." When this parameter normalization is selected, normalization of a parameter involves subtracting the mean from the parameter and dividing it by the standard deviation for the parameter. Therefore, if the parameters are normally distributed, the variables will then become distributed with a mean of 0 and variance of 1. This normalization option is generally recommended if, for example, two parameters vary equally, but over different ranges. This option will then normalize the distributions so that the parameters vary over the same range.

Also within parameter normalization section 220 is a "user defined offset and gain" normalization option. Selecting this type of normalization allows for using prior information to weight a particular parameter more strongly or weakly when the emphasis of the parameter is known. Parameter normalization 220 also includes a "neither" normalization option. Selecting this option prevents normalization of the data. This option may be useful if one or two of the parameters are known to dominate the data compared with all others. In this case, attention is paid to the lesser parameters or possibly excludes them all together.

Unit normalized vectors checkbox 234 in clustering setup window 214 may be selected to normalize all data to lie in a unit sphere. This is similar to the "use mean and standard deviation" option in parameter normalization section 220 except that the parameters are normalized all at once rather than on a per parameter basis. This option may be useful when it is suspected that a number of rogue data points exist within the data set. If some parameters have much greater variability than others, however, they will become the dominant factors in the clustering process.

Parameter selection section 222 in an exemplary clustering setup window 214 of FIG. 11 shows general information on the parameters that may be used in the clustering process. Section 222 includes parameters available field 222a that indicates the number of fields in the chosen data set and parameters selected field 222b that indicates the number of parameters selected for the current clustering run. Parameters for clustering may be selected by choosing select parameters for clustering button 222c that provides access to a parameter selection window.

Figure 12:
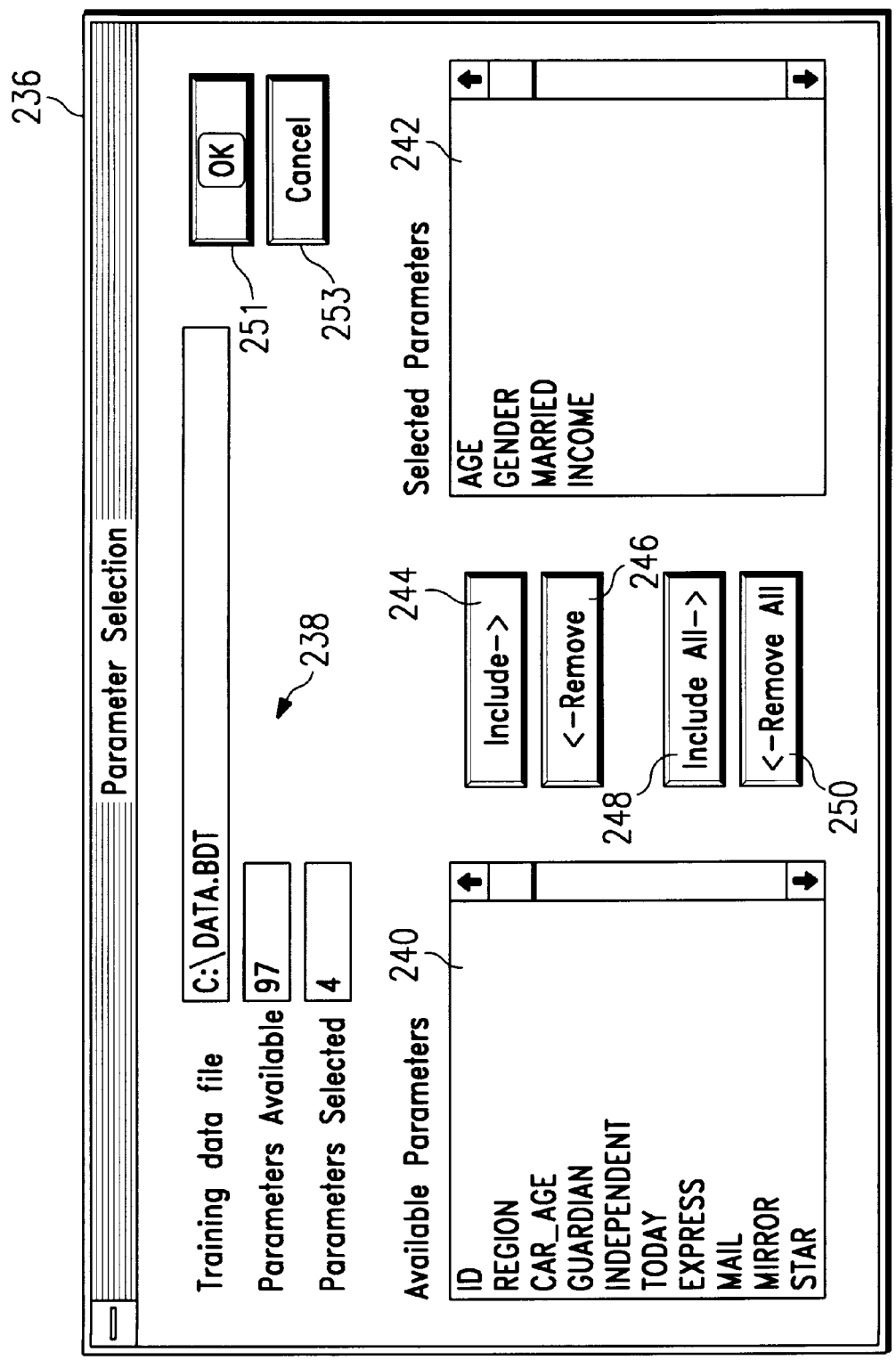
FIG. 12 depicts an exemplary parameter selection window for use with the neural clustering function available with the present invention.

FIG. 12 illustrates an exemplary parameter selection window 236 for selecting a parameter for use in neural clustering function 36 of data analysis system 10 of the present invention. Parameter selection window 236 preferably includes data file information section 238, which includes a data file name field, a parameters available field for the selected data file, and a parameters selected field for specifying the number of parameters to be used in a clustering run.

Parameter selection window 236 also preferably includes available parameters section 240, which includes a list of all available parameters in the specified data set. Selected parameters section 242 in parameter selection window 236 includes the names of all the parameters that have been selected for the current neural clustering run. Using include button 244, remove button 246, include all button 248, and remove all button 250, parameters may be moved between available parameters section 240 and selected parameters 242 as desired for a given neural clustering run.

Once the parameter selection is complete, parameter selection window 236 may be closed by selecting OK button 251. Alternatively, a parameter selection process may be cancelled at any time by selecting cancel button 253 in window 236.

Returning to FIG. 11, training setup section 224 in clustering setup window 214 may be used to define the size of a cluster map as well as the number of training cycles for a cluster run. Section 224 accordingly includes map width input field 252 for specifying the number of clusters along one edge of a cluster map. The total number of clusters is preferably the square of the number. A default for the number of clusters may be set at, for example, four and a maximum number of clusters may be limited to, for example, thirty. Number of training cycles input field 254 may be used to input and display the number of complete runs through a data file by neural clustering function 36. Therefore, if the data consisted of, for example, 10,000 items and training cycles input field 254 is ten, then 10 times 10,000 equals 100,000 passes through the clustering network. A default number of training cycles may be set at, for example, 10 cycles.

Training setup section 224 in clustering setup window 214 in FIG. 11 also preferably includes advanced clustering configuration button 256. Selecting button 256 provides access to advanced clustering configuration section 258 in window 214. Section 258 includes initial update neighborhood size input field 260 that is the radius that should be set to approximately 30% to 40% of the total map dimensions, e.g., for an 8×8 cluster map input field 260 should be set to 3 or 4. Values under 20% of the map size in initial update neighborhood size input field 260 could lead to the possibility of unused clusters within the map unless the map is further trained in a later session. A default value for field 260 may be set to, for example, 1.9.

Final update neighborhood size input field 262 of advanced clustering configuration section 258 should preferably be set between zero and one. If field 262 is set to zero, then every cluster has a possibility of becoming a cluster center. If set to one, there is a possibility of a lesser distinction between adjacent cluster. A default for field 262 is, for example, 0.5. Weight update factor input fields 264 include an initial weight update factor field and a final weight update input field. The weight update factors determine how fast the network adapts to each new example. A large initial weight update factor is used to quickly establish the network cluster structure. The final weight update factor is used at the end of the training process to further define the clustering structure. A default initial weight update factor of, for example, 0.9 and a default final factor of, for example, 0.1 may be suitable.

Also within advanced clustering configuration section 258 is randomize training data checkbox 266. Checkbox 266 may be selected to help avoid the possibility that some artificial clusters may form. Training times will increase, however, when checkbox 266 is selected. Advanced cluster configuration section 258 also preferably includes force activation update checkbox 268. Selecting checkbox 268 allows the cells that may have been frozen out earlier in the clustering process, i.e., are empty, to take part in the clustering process again. So, for example, if due to a random effect most of the clusters are forming in an 8×3 region of an 8×8 map, by selecting force activation update checkbox 268, neural clustering function 36 will allow the clusters in the 8×3 region to spread out again and make full use of the 8×8 cluster map. A default value for checkbox 268 is, for example, not to force activation update.

Once all of the setup information is input into neural clustering setup window 214, then OK button 270 may be selected to initiate a clustering run. Alternatively, a clustering setup may be cancelled at any time by selecting cancel button 272.

Once a neural clustering run has been made within neural clustering function 36 various analyses of the results is possible. Neural clustering function 36 allows for segmenting the data set in terms of similarity to a set of user defined criteria. For example, in a customer marketing application, the data set may include information on customer socio-demographics, such as age, income, occupation, and lifestyle interests. Neural clustering function 36 within data analysis system 10 may be used to select a subset of these parameters and cluster on them to determine whether they fall into natural groupings that allow for more selective, personalized marketing.

Continuing the customer marketing example, the present system's clustering analysis capability provides a mechanism for generating a better understanding of who the customers are and how they behave. Clustering function 36 can be used to identify the most commonly occurring customer types and also the more unusual customers. It may also be used to identify the discriminating characteristics of individuals who buy particular products or services, or that behave in a particular way. Using neural clustering function 36, previously unknown relationships can be uncovered in data and expected relationships may be verified quickly and easily.

Figure 13:
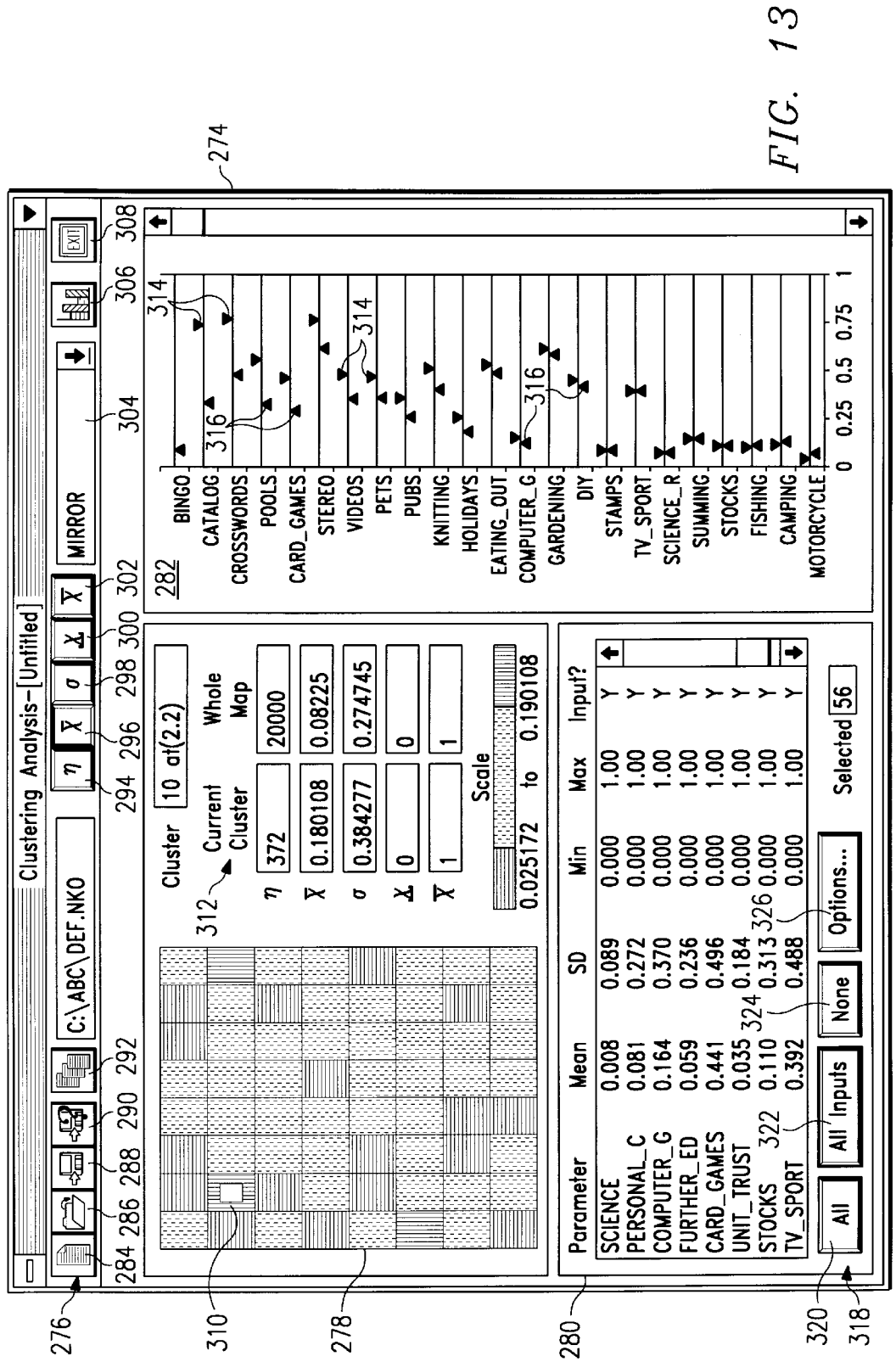
FIG. 13 illustrates an exemplary clustering analysis window in accordance with the present data analysis invention.

FIG. 13 illustrates an exemplary clustering analysis window 274. Window 274 preferably includes toolbar 276, cluster map 278, parameter statistics information 280, and parameter graphs 282. Toolbar 276 includes initiate new input data configuration button 284, open new input data configuration button 286, save data input configuration button 288, and save data input configuration as button 290. Select results button 292 in toolbar 276 may be used to select a particular results file for further analysis in clustering analysis window 274.

Occupancy ($\eta$) button 294 in toolbar 276 may be selected to view the number of members in each cluster. Mean or average-value ($\bar{\chi}$) button 296 may be selected to view the average value of a currently selected value for each cluster. Standard deviation ($\sigma$) button 298 may be selected to view the standard deviation for a currently selected parameter for each cluster. Minimum value ($\chi$) button 300 and maximum value ($\hat{\chi}$) button 302 may be used to view the minimum and maximum value of a currently selected parameter for each cluster, respectively.

Also, preferably contained in toolbar 276 is current parameter selection field 304 that displays the name of the current parameter selection. Initiate histogram plotter button 306 in toolbar 276 may be selected to initiate the plotting of a histogram while exit button 308 in toolbar 276 may be selected at any time to exit the clustering analysis portion of neural clustering function 36.

In one embodiment of the present invention, cluster map 278 is displayed as a multi-hued square grid. Alternatively, appropriate grey-scalings or shading, as shown in FIG. 13, may be employed for cluster map 278. Each cell in cluster map 278 may be color-coded representing minimum and maximum values for the selected parameter. Unoccupied cells may be displayed in gray, and cells of similar color aggregate to form a cluster. Cluster map 278 is a continuous surface and there are no edges to the map. This means that if a cluster forms on the bottom edge and there is a similar cluster directly above the top edge then these cells preferably aggregate to form the same cluster. The user may interact with the cluster map via pointing device 18. Box 310 denotes the current cluster cell selection.

Directly adjacent to clustering map 278 in window 274 of FIG. 13 are summary statistics 312. Summary statistics 312 include occupancy, mean value, standard deviation, and minimum and maximum values for the currently selected parameter in the selected cell as well as the currently selected parameter with respect to the whole cluster map.

When a new cluster map is loaded for analysis via window 274, the default statistic for the map is occupancy, i.e., the number of members in each cell. By selecting occupancy button 294, standard deviation button 298, minimum value button 300, or maximum value button 302 in toolbar 276, the appropriate statistics will display in summary statistics 312. In the example shown in FIG. 13, the currently selected parameter is readership for the Daily Mirror as represented by parameter name "MIRROR" in parameter field 304. According to the example presented in FIG. 13, approximately 18% of the occupants in the cell selected with box 310, cluster number 10 as identified in the "Cluster" field of summary statistics 312, read the Daily Mirror, compared with the average of around 8% for the whole map.

Parameter statistics information 280 in clustering analysis window 274 preferably displays the mean, standard deviation, and minimum and maximum value for all available parameters, together with a flag ("Y") under the input column indicating whether the parameter was used during the clustering process. Using pointing device 18, a parameter in parameter statistics information 280 may be selected and plotted in parameter graphs 282.

Parameter graphs 282 display a graph of the currently selected parameters. Each parameter is plotted on a horizontal scale, normalized from zero to one. Downward facing triangles 314 denote the average value of the parameter for the selected cell, compared with the average value of the parameter for the population as a whole that is represented by upward facing triangles 316.

Parameter graphs 282 are controlled with control buttons 318. Buttons 318 include all button 320 that when selected causes all parameters for the selected cell to be displayed in parameter graphs 282. All inputs button 322 may be selected to display a graph of all cluster inputs for a selected cluster cell. Selecting none button 324 prevents parameter graphs 282 from being displayed. Also, control buttons 318 include options button 326 that pulls up a graph options dialogue box.

FIG. 14 illustrates exemplary graph options dialogue box 328 that may be used to modify the graphs displayed in parameter graphs 282 in clustering analysis window 274 when options button 326 is selected. Using dialogue box 328 the graphs in cluster analysis window 274 may be modified as desired. By selecting none option 330, which may be the default option, the parameters in parameter graphs 282 will be presented in the order that the parameters are stored in the data set. Selecting cluster mean option 332 allows the parameters to be displayed in the order of maximum mean value. By selecting cluster and population mean difference option 334, the parameters within a cell that vary most significantly from the norm, i.e., the overall population, are displayed. The parameters will then be ranked and presented in terms of maximum positive deviation through to maximum negative deviation. Also, selecting cluster and population mean absolute difference option 336 allows the parameters to be ranked in absolute terms, i.e., ranked in terms of absolute variation from the population mean.

Use labels checkbox 338 in graph options dialogue checkbox 328 is typically checked as a default option. When not checked, parameter graphs 282 will be drawn without the spread range bars, i.e., with just triangles 314 and 316. Also when checkbox 338 is not checked, parameter graphs 282 will be scaled according to the range of the largest parameter in the set. Once the options in dialogue box 328 are specified, box 328 may be closed by selecting OK button 337. Changing the graph options may be canceled at any time by selecting cancel button 325.

Figure 15:
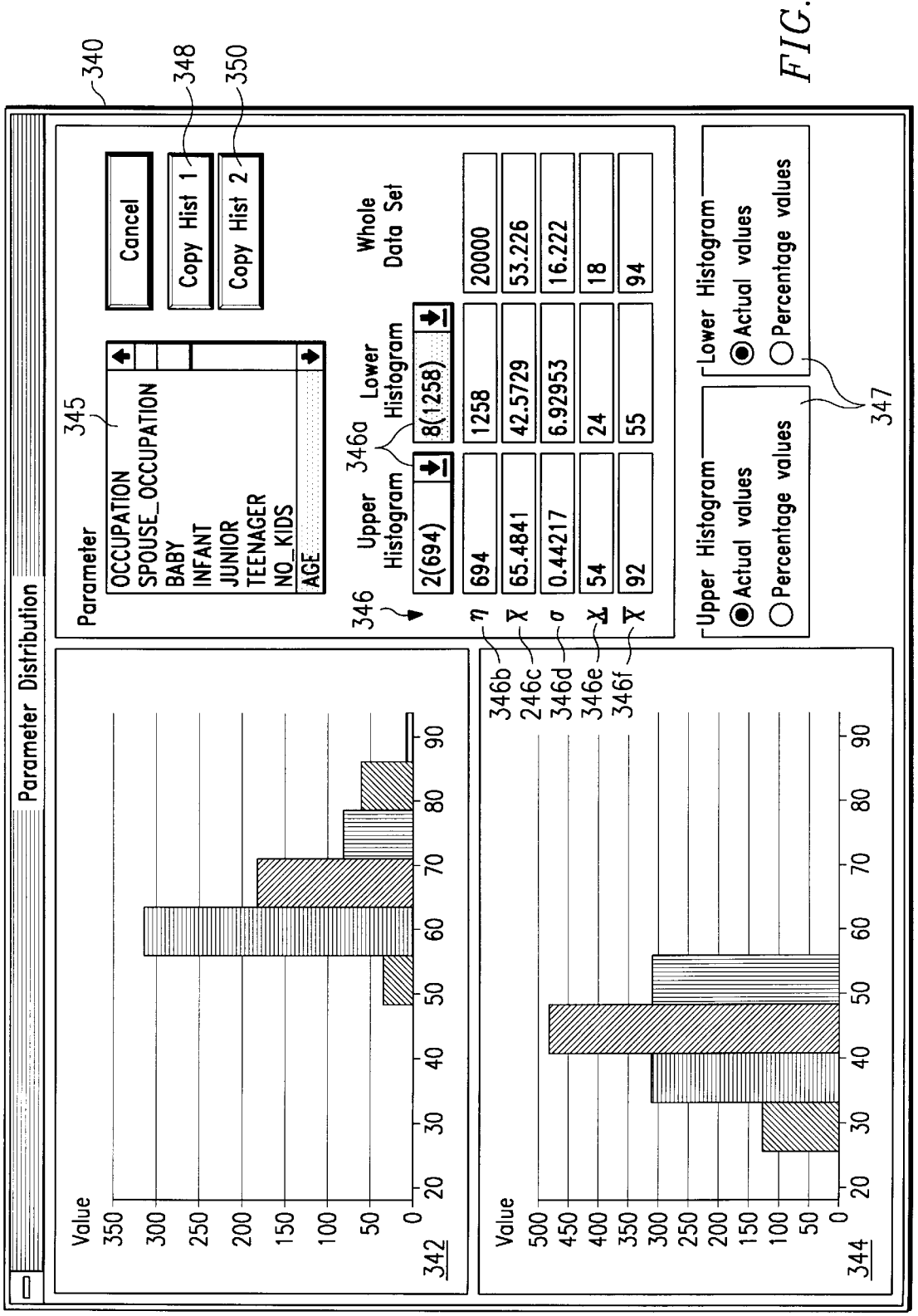
FIG. 15 illustrates an exemplary parameter distribution window with histograms available with the present invention.

Returning to FIG. 13, a histogram for any cell or group of cells may be initiated by selecting histogram button 306 in toolbar 276 in clustering analysis window 274. Selecting histogram button 306 presents parameter distribution window 340, and an example of which is shown in FIG. 15. Window 340 allows for exploring the distribution of individual parameters across one or more cluster cells.

Parameter distribution window 340 of FIG. 15 preferably includes upper histogram 342 and lower histogram 344. Window 340 also includes parameter list section 345 that may be used to select the parameter for plotting in the histograms. Histogram information section 346 includes cluster number and occupancy field 346a, occupancy field 345b, mean field 346c, standard deviation field 347d, and minimum value 347e and maximum value 348f fields for both histograms and the whole data set.

In the example shown in FIG. 15, the distribution of the parameter AGE selected in parameter list section 345 is in top histogram 342 for cluster cell number "2" and lower histogram 344 for cluster cell number "3". Summary statistics 346, e.g., occupancy, mean, standard deviation, and minimum and maximum values, are also provided for upper 342 and lower 344 histograms compared to the data set as a whole. Histograms 342 and 344 in window 340 may be displayed as actual values, which is the case in the example of FIG. 15. Alternatively, histograms 342 and 344 can be displayed as percentage values by making appropriate selections in values sections 347 of window 340.

Copy Hist 1 button 348 and Copy Hist 2 button 350 copies the associated histogram to a clipboard in order that the histograms can be imported as bit maps to an appropriate application, for example, a word processing application. Once copied to the clipboard, the histograms may then be pasted into a word processing document.

Neural prediction function 38 of data analysis system 10 of the present invention provides predictive modeling capability. This capability may be particularly beneficial in a customer analysis setting in predicting future behavior of current or prospective customers by learning from actual customer behavior. Neural prediction function 38 utilizes supervised learning neural network technology having the capability to learn from historical behavior stored in database(s) 44. This technique may be used to predict any aspect of behavior for which records of historical behavior are stored in database(s) 44. For customer databases, this behavior may include product preference, customer profitability, credit risk, and likelihood of fraud. In implementing a direct marketing campaign, for example, neural prediction function 38 may be used to analyze records of individuals who did and did not respond to marketing campaigns. Function 38 may be used to score prospect lists to identify those individuals most likely to respond to a future marketing campaign.

Neural computing is an advanced statistical data processing technique. Unlike conventional techniques that require programming with complex rules and algorithms, neural networks develop their own solutions to problems by learning from examples taken from the real world. For suitable applications, the technique can provide exceptional benefits in the ability to rapidly develop effective, computationally efficient solutions to complex data processing problems.

One embodiment of neural prediction function 38 of data analysis system 10 of the present invention uses a type of supervised learning neural network known as "multi-layer perception" (MLP) network. MLP comprises a large number of simple interconnecting processing elements (neurons) arranged in three layers. Each neuron within the architecture combines the weighted outputs from the neurons in the previous layers, passes this through a non-linear transfer function, and feeds the results on to the neurons in the next layer. The input neurons take in the input information, while the output neurons provide the prediction. In the customer data set example, the input neurons receive customer information stored in a database and the output neurons produce the customer behavior prediction.

FIG. 16A illustrates MLP neural prediction network 352. Network 352 comprises three levels of neurons 354, including first level 356, second level 358, and third level 360. Each neuron in a given level connects to every neuron in the level below and above it, where appropriate, by interconnections 362.

FIG. 16B represents the functionality of each neuron 354 in neural network 352. Each neuron combines the weighted outputs from the neuron in the previous layer, passes it through a non-linear transfer function, and feeds the results to the next layer of neurons.

Because neural network 352 represented in FIGS. 16A and 16B uses a non-linear processing element as the fundamental building block of system neuron 354 it is capable of modeling complex non-linear relationships. Also, the weights on interconnections 362 (not explicitly shown) determine the nature of the predictions made by neural network 352. These weights are defined during a "training" process with the system of weights effectively representing "knowledge" derived from the training data.

FIG. 17 illustrates an exemplary flowchart for neural prediction function 38 of data analysis system 10 of the present invention. Neural prediction function 38 begins at step 364 whenever one of prediction buttons 50 in main toolbar 45 is selected (see FIG. 2). At step 366 in neural prediction function 38 a predictive model setup is defined. Step 366 essentially involves defining the parameters are to be predicted. In the customer database example, the parameters to be predicted may include, for example, mail responsiveness, credit risk, profitability, etc. Also at step 366 the parameters that the predictions are to be based on are specified, e.g., age, income, etc. Additionally, at step 366 the data may be divided into two groups: a training set for use in developing the models and an independent test set for use in testing the predictive capability.

At initialize predictive network step 368 in neural prediction function 38, a random set of network weights for interconnections 362 is generated. Next, at step 370 the training process is started. In start training process step 370 neural prediction function 38 takes the first record and enters the appropriate information into the neural network's input neurons (neuron level 356 in FIG. 16A). Because these initial weights are randomly chosen, the network's initial output prediction is random. This initial prediction is compared to known historical behavior for that record and a training algorithm is used to alter the weights on interconnections 362 so that the next time a similar record is presented to the network its prediction will be closer to known historical behavior.

At step 372 the training process is completed. This involves repeating start training process step 370 a number of times for all records in the training set. As neural prediction function 38 goes through the training process, the prediction will gradually get closer and closer to actual values.

At step 374 the results of training process steps 370 and 372 may be tested. The neural network's predictive capability is tested on a test sample data set. The goal at step 376 is to see how well the system predicts the known behavior without prior knowledge of that behavior. One way to test this prediction is to feed the prediction into rule based segmentation function 34 to analyze the overall prediction accuracy of the network and also provide information on the correlation between record profile and prediction accuracy.

At step 376 in neural prediction function 38 in FIG. 17 an iterative refinement of the neural prediction process may take place. As previously stated, this may involve using rule based segmentation function 34 to compare the predictive performance between the training data set and the test data set. Significantly better predictive performance on the training set may be indicative of over-learning and poor model generalization in the network. The objective of training steps 370 and 372 is to produce a model that accurately reflects the complex interrelationships between the input and output parameters yet is sufficiently simple to be generic. The trade-off between accuracy and generalism is controlled via the number of input parameters chosen and their encoding schemes. As with any statistical modeling system, the model predictions must be carefully examined as well as the sensitivity of the predictions to each input parameter. The model setup may be interactively refined to reproduce the required performance.

Once step 376 is complete, neural prediction function 38 may be exited. The steps of neural prediction function 38 have now generated a predictive network that may be used to predict expected behavior from a data set.

Figure 18:
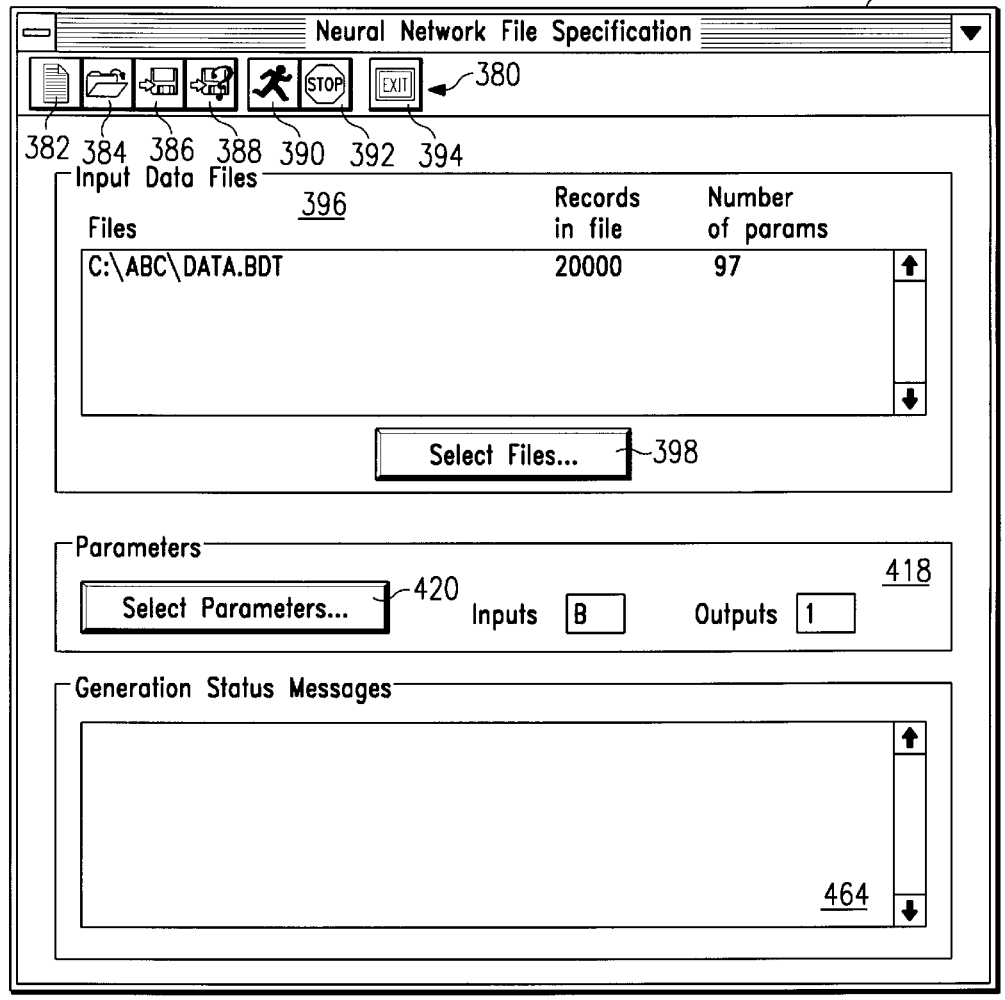
FIG. 18 shows an exemplary neural network file specification window for use with the neural prediction function of the present invention.

FIG. 18 illustrates an exemplary neural network file specification window 378, which in one embodiment of the present invention is the main window for neural prediction function 38. Window 378 preferably includes toolbar 380. Toolbar 380 includes initiate new network configuration button 382, retrieve network configuration button 384, save data input configuration button 386, and save data input configuration as button 388. Toolbar 380 also includes run button 390 for creating a file specification and stop button 392 for stopping a neural network file specification process. Exit button 394 in toolbar 380 closes neural prediction function 38.

Neural network file specification window 378 also preferably includes input data files section 396. Section 396 allows for browsing and selecting from available data files in a given directory a data file for use with neural prediction function 38. Raw binary files may be selected via select files button 398, which pulls up an appropriate input file selection dialogue box.

Figure 19:
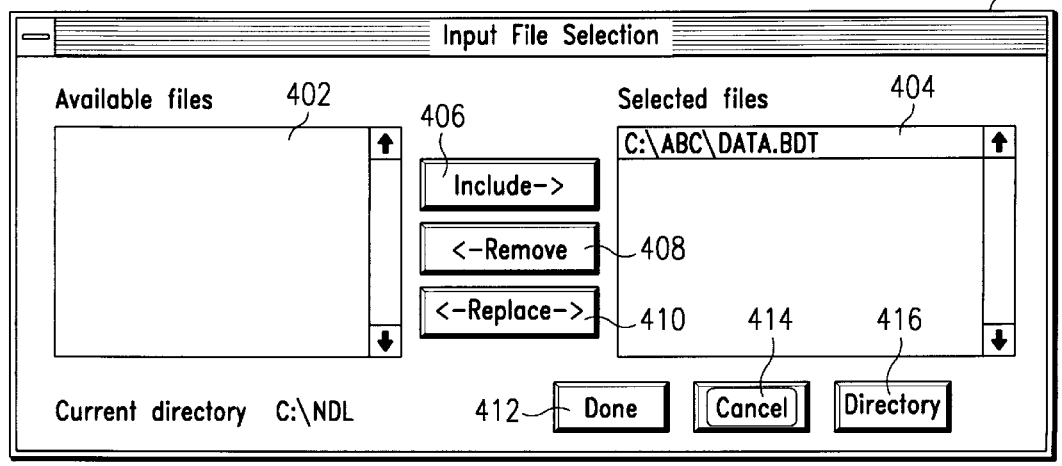
FIG. 19 depicts an exemplary input file selection dialog box for use with the neural prediction function of the present invention.

FIG. 19 shows an exemplary input file selection dialogue box 400 for selecting a file for processing with neural prediction function 38 and is exemplary of a dialogue box available when select files button 398 in window 378 is selected. Dialogue box 400 preferably includes available files section 402 and selected files section 404. Using include button 406, remove button 408, and replace button 410, files may be moved from available files section 402 to selected files section 404, and vice versa. Once the appropriate files are selected for processing, done button 412 closes dialogue box 400. Alternatively, the file selection process may be canceled at any time by selecting cancel button 414. Access to additional directories for selecting files may be obtained by selecting directory button 416.

In one embodiment of the present invention, using input file selection dialogue box 400 up to five input files may be selected for processing. These files may be of the same length and have disjoint parameters. It is preferred, however, that a single file be created from the several files using the data merge capability of the present invention described in discussions relating to FIGS. 29 and 30.

Returning to FIG. 18, neural network file specification window 378 also preferably includes parameter selection region 418. In one embodiment of neural prediction function 38 of the present invention, the maximum number of input parameters to a neural network is forty. It is noted that the maximum number of input parameters may be varied without departing from the spirit and scope of the present invention. Selecting the parameters for a model is accomplished by choosing select parameters button 420 that provides access to a window for specifying parameters.

Figure 20:
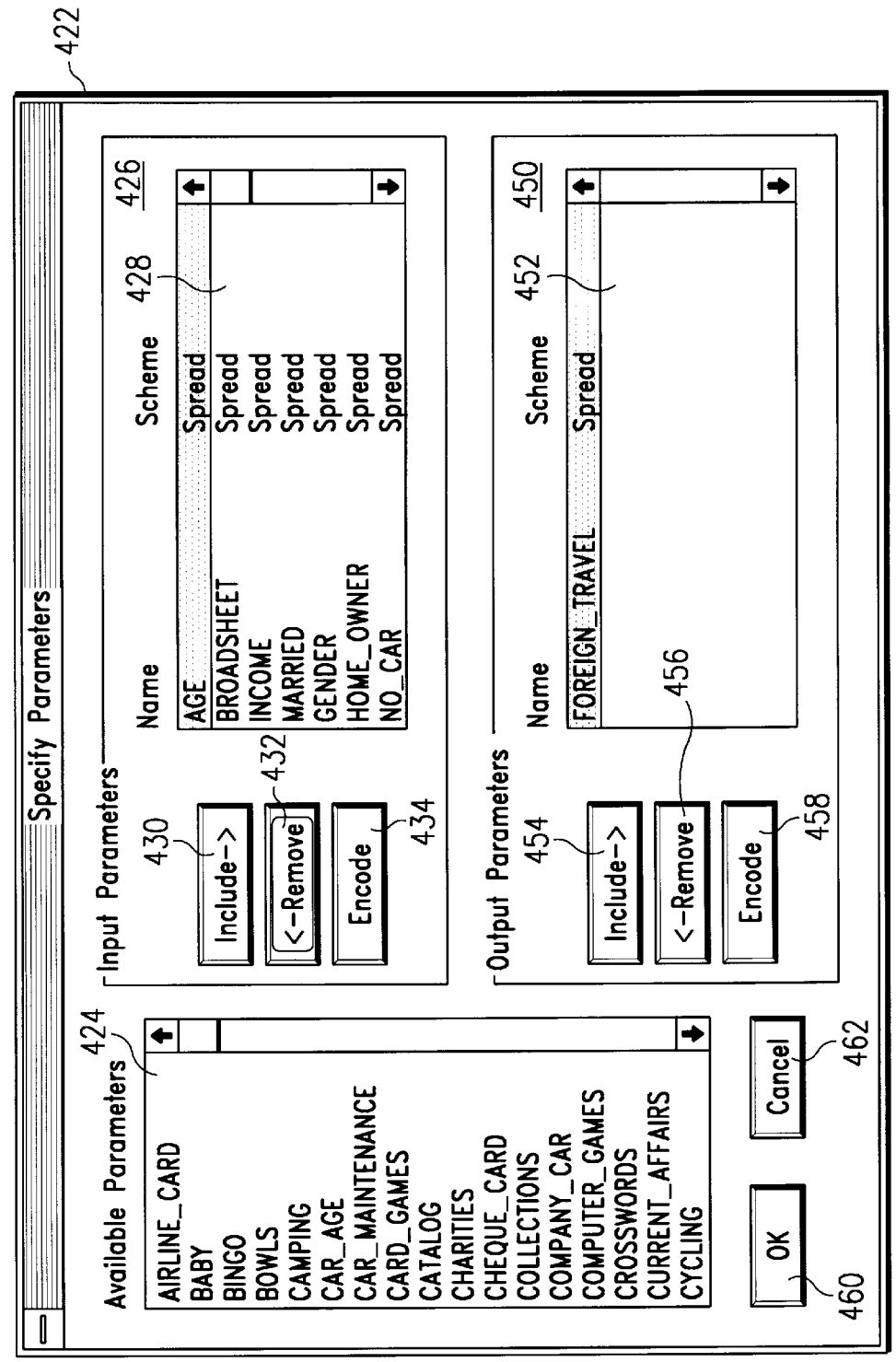
FIG. 20 shows an exemplary specify parameters window for use with the neural prediction function available with the present data analysis invention.

FIG. 20 illustrates exemplary specify parameters window 422 for use in selecting the input and output parameters for a neural network and is provided when select parameters button 420 in window 378 is selected. Window 422 preferably includes available parameters section 424, which provides a list of the parameters available for a data file. Window 422 also includes input parameters section 426 for selecting the input parameters for a neural prediction network. Input parameters section 426 preferably includes parameter name section 428 showing the names of the input parameters and the scheme for the encoding of each parameter, which will be described in discussions relating to FIG. 21. Input parameters section 426 also has include button 430 for adding a selected parameter in available parameters section 424 to parameter name section 428 in input parameters section 426. Remove button 432 removes a selected parameter from parameter name section 428. Encode button 434 in input parameters section 426 may be selected to provide the encoding scheme for an input parameter.

For each network input parameter, an encoding scheme must be specified. In one embodiment of neural prediction function 38 of data analysis system 10, three different encoding schemes are supported and will be described in discussions relating to FIG. 21. Also, the minimum and maximum values for each input should be specified along with the number of neurons over which the input value is to be encoded. The minimum and maximum values are typically the minimum and maximum values of the input parameter. Exceptions may be necessary when the parameter has a long-tailed distribution in which case some other value may be selected, e.g., +/-4 standard deviation s. Values of the input parameter greater than the maximum specified value are clipped to the maximum value, and parameter values less than the minimum specified value are set to the minimum value.

Figure 21:
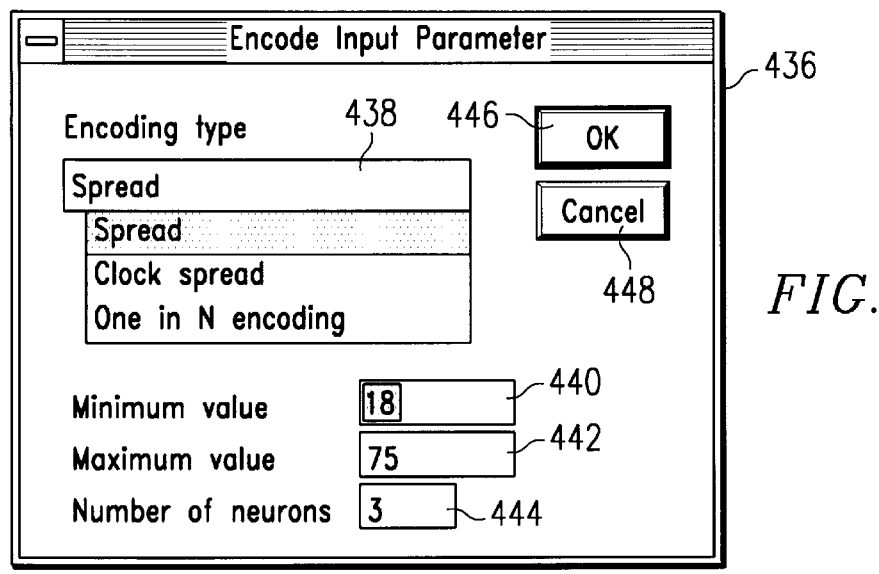
FIG. 21 illustrates an exemplary encode input parameter dialog box for use with the neural prediction function of the present invention.

FIG. 21 shows an exemplary encode input parameter dialogue box 436 that may be accessed when encode button 434 in input parameters section 426 of specify parameters window 422 is selected. Dialogue box 436 may be used to encode the input parameters and specify the minimum and maximum input parameter values and the number of neurons on which the input parameter is to be input.

As previously stated, one embodiment of the present invention supports three types of input encoding schemes including spread, clock spread, and one-in-N encoding. Accordingly, dialogue box 436 preferably includes encoding type section 438 for selecting the appropriate encoding scheme for a parameter. Dialogue box 436 also includes minimum value input 440, maximum value input 442, and number of neurons input 444 for specifying these values for a parameter. Once the information in dialogue box 436 is complete, the selections in dialogue box 436 are accepted by selecting OK button 446. Changes to an input parameter via dialogue box 436 may be terminated at any time while in dialogue box 436 by selecting cancel button 448.

With spread encoding, the parameter of interest is spread across the neurons. If the number of encoding neurons in number of neurons input field 444 is set to one, the minimum input value is associated with an activation of zero, and the maximum input value is associated with an activation of one. The parameter value is then encoded by assigning an activation linearly between these limits. Otherwise, the first neuron is assigned a spot value corresponding to the minimum value and the last neuron the maximum value. The intermediate neurons are assigned spot values linearly from the minimum to the maximum values. The activation values for these neurons are then assigned so that the dot product between the vector of activation values and the vector of spot values equals the parameter value. Furthermore, the sum of the activation values is equal to one and no more than two neurons are activated. If a parameter value lies outside the encoding range then it is encoded as if it was the minimum value if it is less than the minimum value or encoded as the maximum value if it is greater than the maximum value. A typical example of a parameter that may be spread encoded is a person's age, where a distribution is required for thresholding purposes.

Clock spread encoding is similar to spread encoding except that the first neuron is assigned two spot values (the minimum and maximum), and the last neuron is viewed as being adjacent to the first neuron in a circular fashion. This method is useful for encoding times, angles, etc., because it gives a smooth transition and activation values when the parameter of value goes full circle.

In one-in-N encoding, N neurons are defined. Only one neuron is given an activation value of one with the rest of the neurons receiving an activation value of zero. If a parameter value is the minimum value, then the first neuron is activated, if it is minimum value plus one, then the second is activated, etc. If the input parameter value is less than the minimum value then the first neuron is activated. If the parameter value is greater than the maximum value then the last neuron is activated. The number of neurons must be the maximum parameter value minus the minimum parameter value plus one.

Additionally, in one-in-N encoding, each neuron corresponds to a class. To encode a parameter value, a class for each parameter is determined and the corresponding neuron is given an activation of one. All other neurons are given an activation of zero. Examples of parameters that may be encoded using one-in-N encoding include marital status (three neurons—married, single, and divorced), gender (two neurons—male and female), and income (multiple neurons corresponding to income ranges).

Returning to FIG. 20, specify parameters window 422 also preferably includes output parameters section 450, which identifies the parameters to be predicted based on the data set. Similar to input parameters section 426, output parameters section 450 includes parameter name section 452, include button 454, remove button 456, and encode button 458. The output parameters for a neural network may be selected and encoded as previously described for the input parameters as described above in discussions relating to input parameters section 426.

By selecting encode button 458 in output parameters section 450, a dialogue box similar to encode input parameter dialogue box 436 in FIG. 21 is provided. Output parameters, however, are preferably encoded in one of two schemes: spread and one-in-N encoding schemes. Additionally, a single output parameter is preferably specified in output parameter section 450 of parameter name section 452.

In the outputs of a neural prediction network the dot product between the vector of activation values and the vector of spot values divided by the maximum activation value equals the output parameter value, i.e., the predicted value from the network. For spread output encoding with only two neurons, the output values are taken to be the dot product of the activations with the spot values, divided by the sum of the activations. Where there are more than two output neurons, the sum of the activations on adjacent pairs of neurons should be determined. The sums of these neurons are examined and the highest one is selected. The activations and spot values for this pair of neurons may be used in decoding a pair of neurons. For one-in-N output encoding, the neuron having the highest activation is noted, and the output from the network is then the class that corresponds to the highest activated neuron.

Continuing with FIG. 20, once the input parameters and output parameters are selected, specify parameters window 422 may be closed via OK button 460. Alternatively, a parameter selection may be canceled at any time with cancel button 462.

Returning to neural network file specification window 378 shown in FIG. 18, window 378 also preferably includes generation status messages region 464. Region 464 provides processing status information once a neural run is initiated via run button 390. Typically, messages are generated for every 1,000 records processed, followed by a finish processing message at record N message. Also, once the neural processing is complete, generation status messages 464 will provide other information, such as the name of the output file, the encoding data file, the header data file, and that the configuration has been saved in the output file. A neural run may be suspended at any time via stop button 392.

Once a predictive network configuration has been specified as described above, neural prediction function 38 may be run on a data set. With neural prediction function 38 of system 10, one or more networks that have been previously specified may be run on a data set. In one embodiment of the present invention, up to thirty different runs, in which the network is run in either training(learning) mode or predict (recall) mode is possible.

Figure 22:
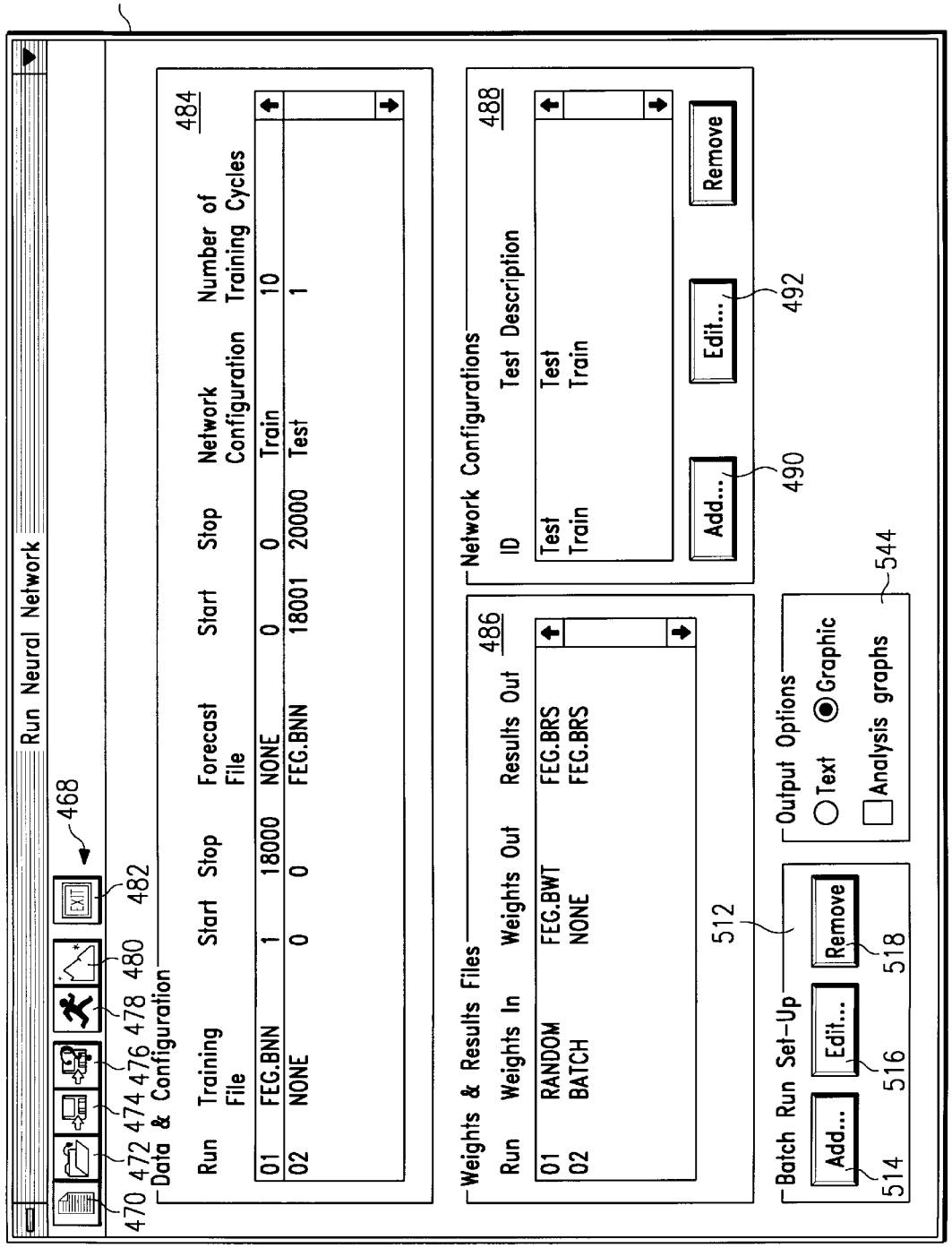
FIG. 22 depicts an exemplary run neural network window for use with the neural prediction function of the present invention.

FIG. 22 illustrates an exemplary run neural network window 466 for running a network configuration on a data set. Run neural network window 466 preferably includes toolbar 468 having initiate new input configuration button 470, open new data configuration button 472, save data input configuration button 474, and save data input configuration as button 476. Run button 478 in toolbar 468 initiates a run with a neural network. View analysis graph button 480 may be selected to display a graph that gives an indication of the status on a neural network's training. Exit button 482 in toolbar 468 may be selected to close neural prediction function 38.

Run neural network window 466 includes data and configuration section 484 that displays a list of currently specified network runs. In the example shown in FIG. 22, two batch runs have been specified. In the first run (Run 01), parameter data is retrieved from a training file, using records from one up to 18,000 with ten iterative training cycles through this data. In the second run (Run 02), neural prediction function 38 is set for predictive, recall mode using records 18,001 through 20,000.

Run neural network window 466 of FIG. 22 also includes weights and results files section 486. Section 486 displays the selections made for these attributes. In the example shown in FIG. 22, Run 01 is using a random weights file for input purposes, but is storing the trained weights in file FEG.BWT; the results themselves are not being stored to a file. In Run 02 weights are input via the BATCH facility, but trained weights are not being stored. The corresponding results in Run 02 stored in file FEG.BRS.

Network configurations section 488 is also provided within run neural network window 466. Section 488 displays the options selected and defined for training or prediction, respectively. Network configurations 488 is given a unique identifier, e.g., predict or train, together with a textual description. Adding or editing these definitions is possible by selecting add button 490 or edit button 492, respectively, which provide an appropriate edit network configuration window.

Figure 23:
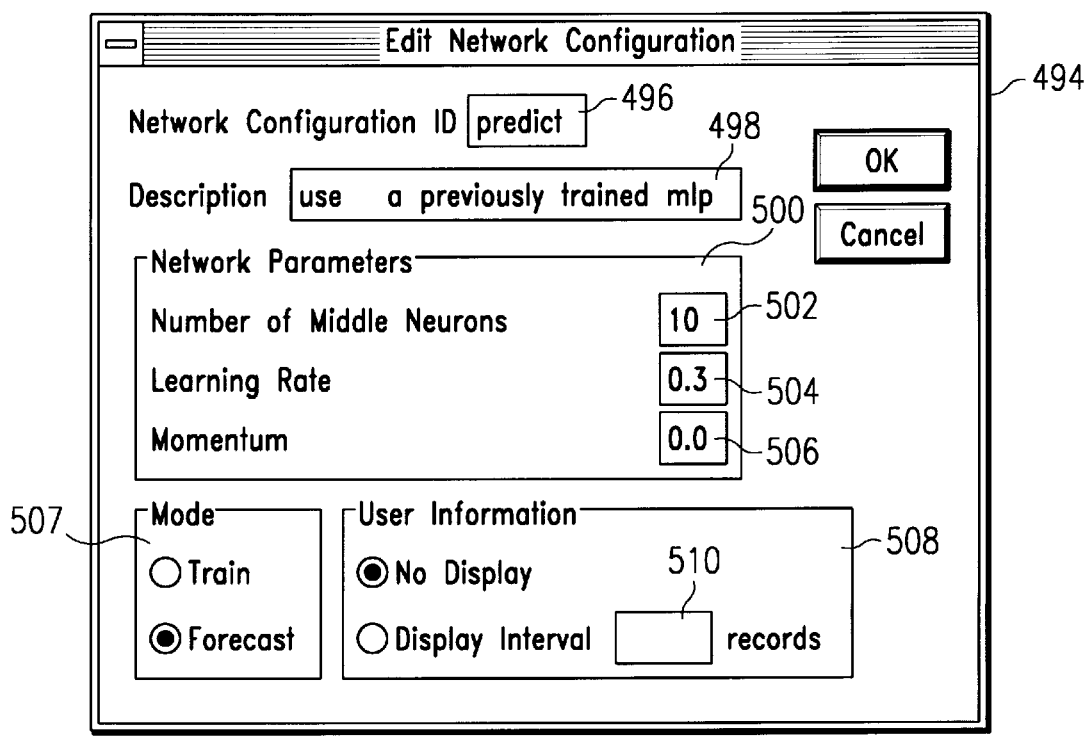
FIG. 23 shows an exemplary edit network configuration window for use with the neural prediction function of the present invention.

FIG. 23 illustrates an exemplary edit network configuration window 494 that in one embodiment of the present invention may be used to edit a network configuration. Window 494 preferably includes network configuration identification (ID) field 496 that shows the name of a particular network configuration ID. Description field 498 in window 494 provides a description of the network configuration ID in field 496.

Edit network configuration window 494 of FIG. 23 also preferably includes network parameters section 500. Section 500 includes number of middle neurons field 502, learning rate field 504, and momentum field 506. The number of middle neurons is typically set to a value equal to approximately 25% of the number of input neurons. The learning rate parameter typically ranges between 0 and 1 and determines the speed of the convergence of the training process. A typical learning rate is 0.3 as shown in FIG. 23, although some experimentation may be required. Small learning rates can lead to excessive training times, while high learning rates can result in a network failing to converge. The momentum parameter allows the network to avoid distortions in the training process and enables the network to evade local minima. The momentum parameter can also be thought of as a smoothing factor applied to the error rate/correction process. Care should be taken, however, to avoid overshooting the global minimum error, i.e., the optimum solution. A typical value for the momentum parameter is 0.2.

Mode section 507 in edit network configuration window 494 must be used to specify the mode of the run in either train or forecast mode. Also, user information section 508 is used to set whether a display and the display's interval are to be provided. When displayed, the frequency of display may be set in display interval field 510.

In one embodiment of neural prediction function 38 of data analysis system 10, three training completion criteria can be used. For the first criteria the maximum number of training cycles is specified. One cycle through a data set is one complete pass through the training set during training. The second type of completion criteria involves setting an error goal. When the entire training set reaches the set error goal, the training is complete. The third completion criteria stops training when the error begins to increase over an evaluation data set. This particular method avoids the network overfitting the training set, i.e., it avoids the problem of over-generalization.

Returning to FIG. 22, batch run set-up section 512 is also preferably provided in window 466. Batch run set-up section 512 includes add button 514, edit button 516, and remove button 518. By selecting add button 514 or edit button 516 a window for editing a run may be provided.

Figure 24:
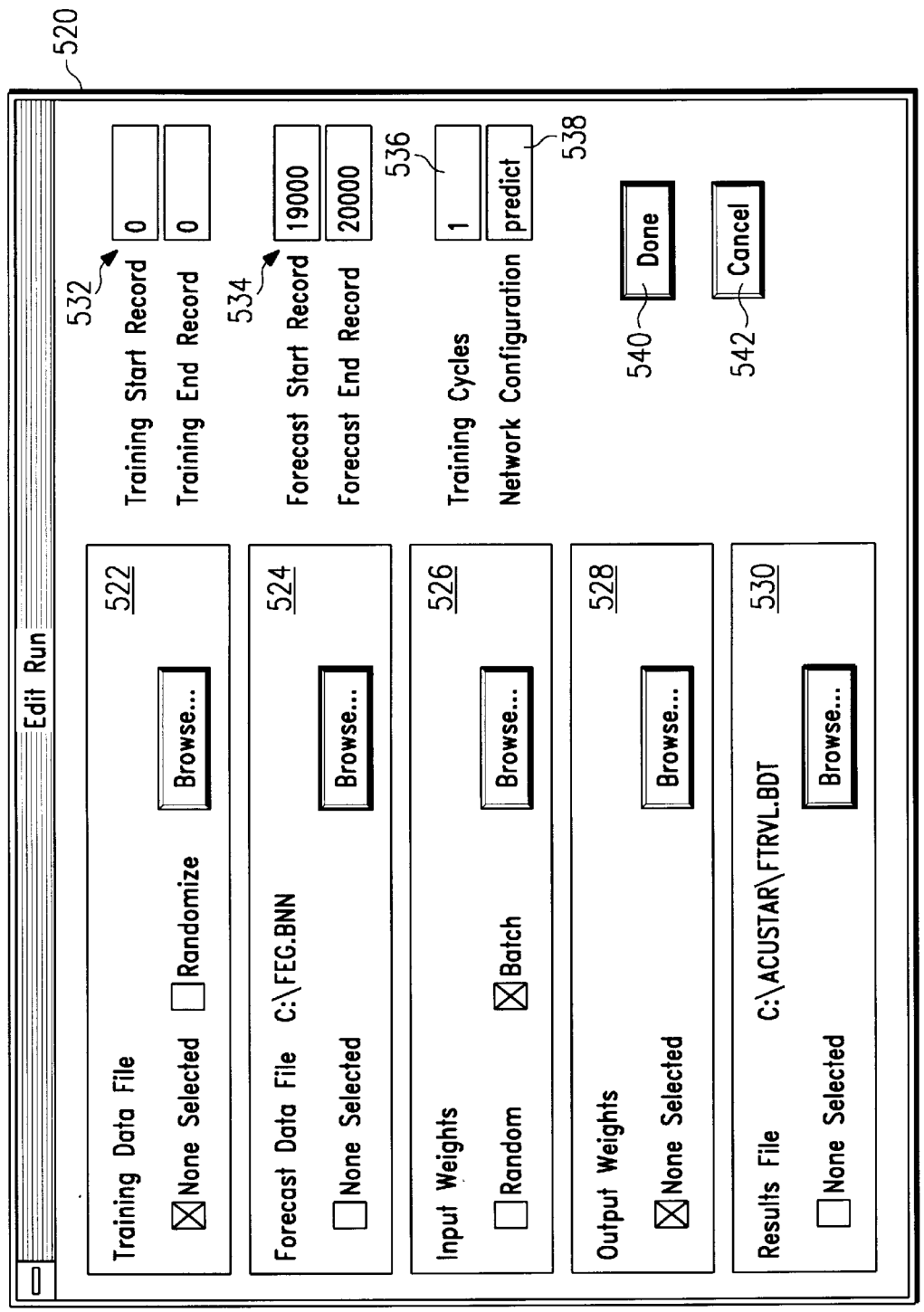
FIG. 24 shows an exemplary neural prediction edit run window for use with the neural prediction window of the present data analysis invention.

FIG. 24 illustrates an exemplary edit run window 520 for editing a particular run. Window 520 preferably includes training data file section 522, forecast data file section 524, input weights section 526, output weights section 528, and results file section 530. Window 520 and its attendant sections allows for browsing and selecting a training data file via training data file section 522. Window 520 also provides for browsing and selecting a forecast data file via forecast data file section 524. Input weights section 526 allows for selecting either random or batch weights. When batch weights are specified, the weights' file corresponding to the previous run will be used. Therefore, the batch option in section 526 is not available for the first run in a sequence. Output weights section 528 provides for browsing and selecting an output weights file. Results file section 530 also provides for browsing and selecting a results file.

Edit run window 520 can also be used to specify the start and end record for a run in section 532. Section 534 in window 520 may be used to specify the start and end forecast record for a run. For example, if a file contained 200,000 records, training on 190,000 records with testing on 10,000 records could be specified with fields 532 and 534. Also the number of training cycles may be specified in training cycle field 536. The neural network's configuration may be set in network configuration section 538 to give it a textual identifier, e.g., train, test, or predict. Once the fields in edit run window 520 are appropriately modified, window 520 may be closed via done button 540. Cancel button 542 may be used at any time to cancel inputs to window 520.

Returning to FIG. 22, run neural network window 466 also includes output options section 544. In one embodiment of neural prediction function 38 of data analysis system 10 of the present invention, three output options as shown in output options field 544 in FIG. 22 are preferably provided. These output options include a text option, a graphic option, and an analysis graphs option.

Figure 25:
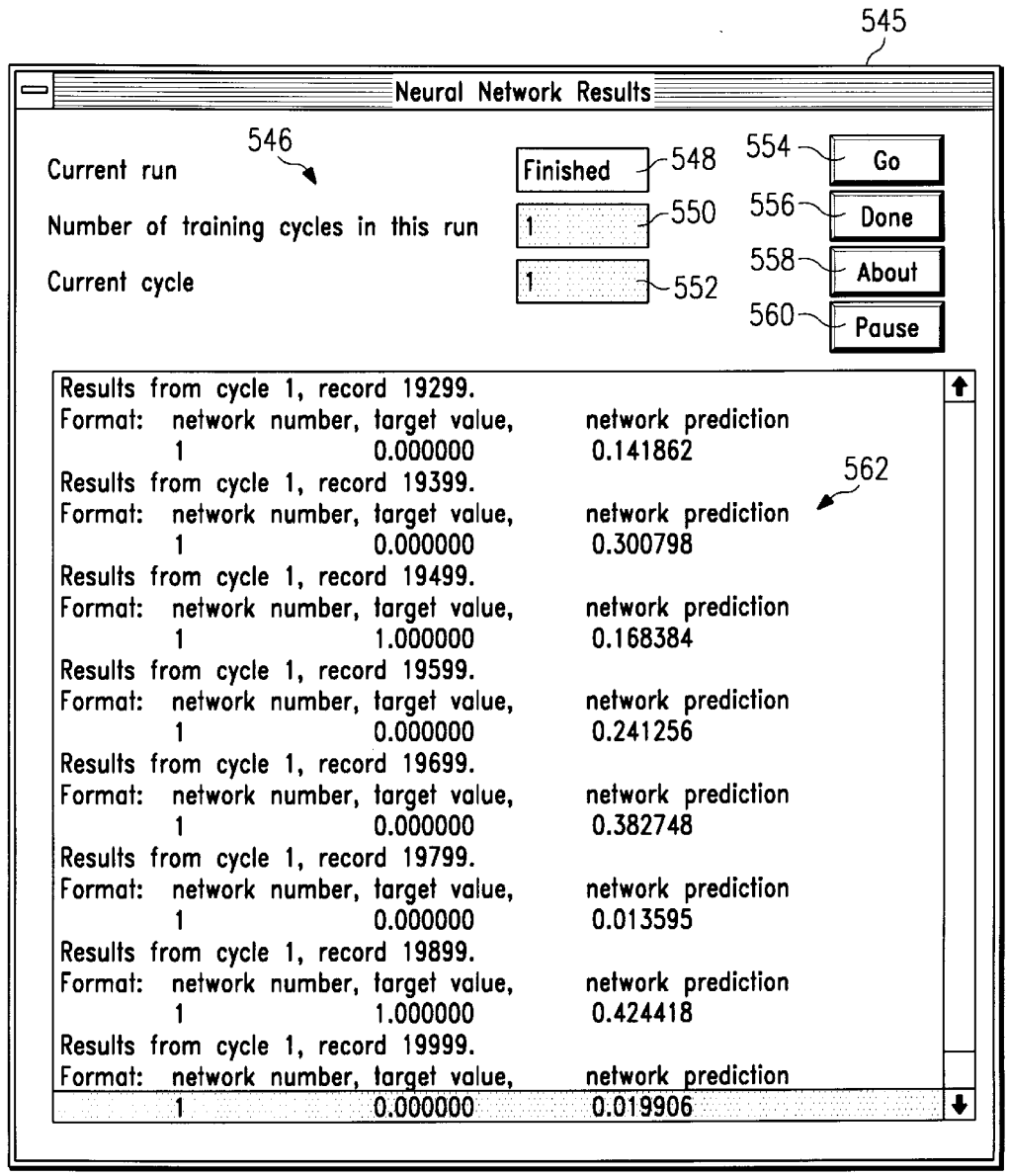
FIG. 25 illustrates an exemplary text neural network results window in accordance with the neural prediction function of the present invention.

FIG. 25 illustrates an exemplary text neural network results window 545 corresponding to the text option in output options 544 in window 466 of FIG. 22. Window 545 preferably includes status information section 546 that includes current run field 548 providing status information on the current run. Number of training cycles in run field 550 specifies the number of training runs for a particular run, and current cycle field 552 specifies the cycle of the run at its current state.

Neural network results window 545 also preferably includes go button 554 for initiating a particular session. Done button 556 indicates once a particular run is complete. By selecting about button 558 information on the current run may be viewed, and by selecting pause button 560 the current run will be suspended. Results information section 562 in window 545 presents textual information on the results of the current neural prediction.

Figure 26:
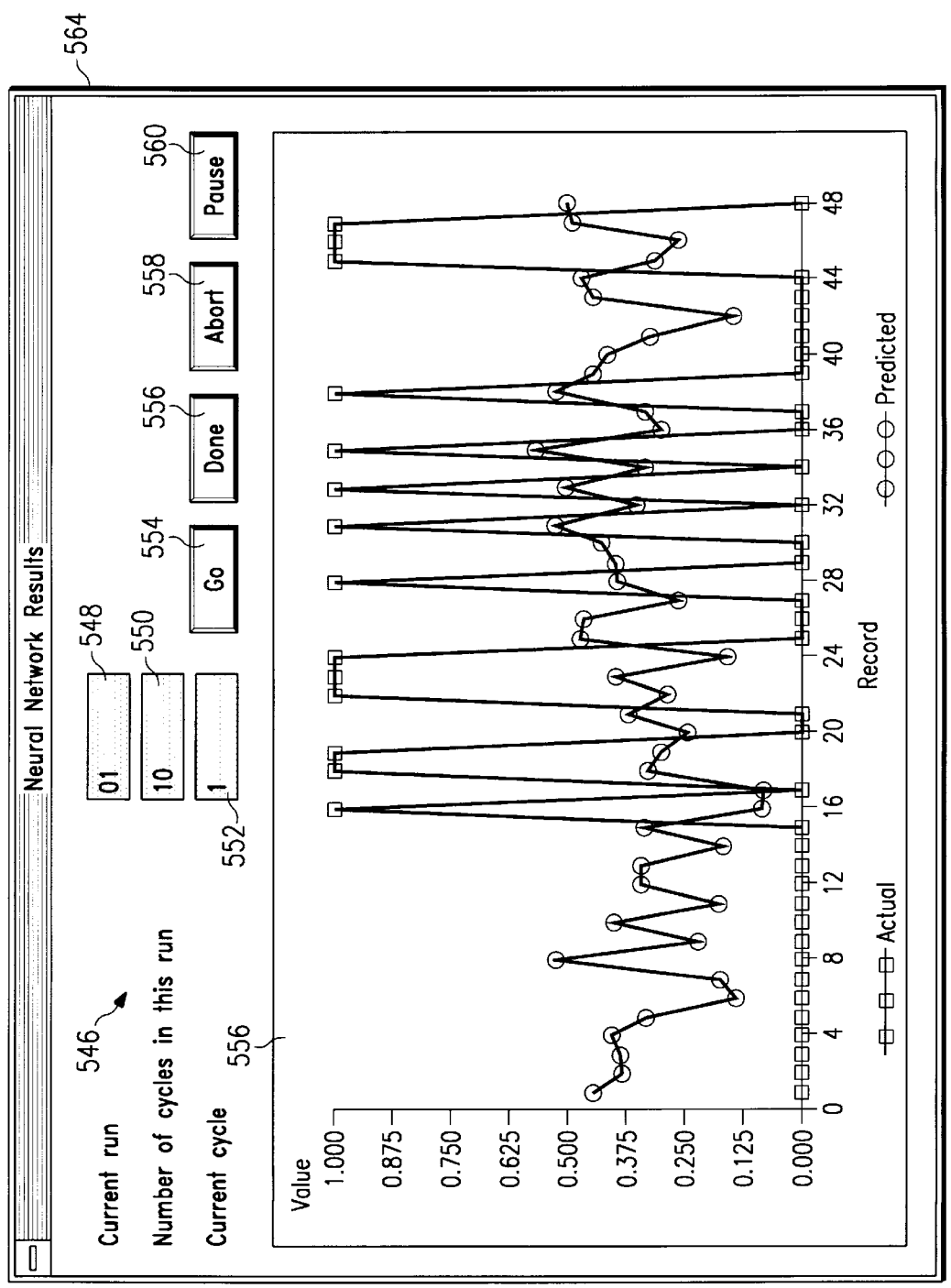
FIG. 26 shows an exemplary graphical neural network results window for the neural prediction function of the present invention.

FIG. 26 illustrates an exemplary graphic neural network results window 564 corresponding to the graphic option in output options 544 in window 466 of FIG. 22. Window 564 preferably includes status information section 546 as previously described. Window 564 also includes graph section 566 providing a graphical representation of the status of a particular neural prediction run. The example in FIG. 26 shows a graphical representation of the actual value of the variable being predicted, compared with the predicted value, for 48 examples in a training set. As training proceeds, the predicted value and the actual value should converge.

When the analysis graphs option is selected in output options 544 in window 466 of FIG. 22, neural prediction function 38 of data analysis system 10 records the errors generated throughout the training run and saves them to a temporary file. Once the training is concluded, a graph of these errors may be viewed by selecting graph button 480 in toolbar 468 as shown in FIG. 22. This produces an appropriate dialogue box for selecting the criteria for plotting the errors.

Figure 27:
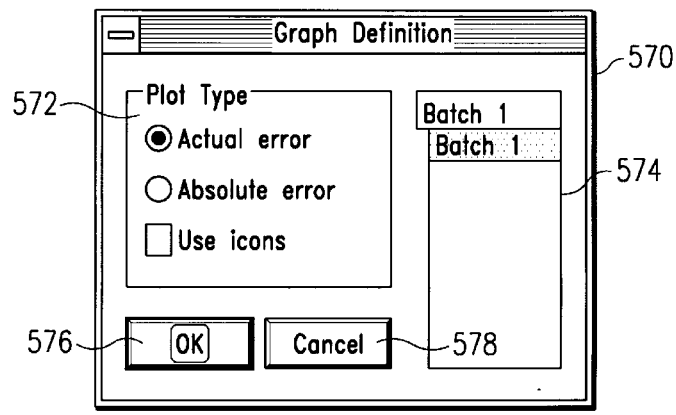
FIG. 27 depicts an exemplary dialog box for defining a graph's characteristics generated with the neural prediction function of the present invention.

FIG. 27 illustrates an exemplary graph definition dialogue box 570 that may be produced by neural prediction function 38 when the analysis graphs option in output options 544 in window 466 of FIG. 22 is selected. Dialogue box 570 preferably includes plot type section 572 for specifying whether the actual error or absolute error should be used in graphing the errors and also whether icons are to be used in plotting the analysis graphs. Also provided within dialogue box 570 is batch information section 574 that lists the number of batches currently in consideration. Once the information within dialogue box 570 is acceptable, OK button 576 may be selected. Alternatively, this operation may be canceled by selecting cancel button 578.

Figure 28:
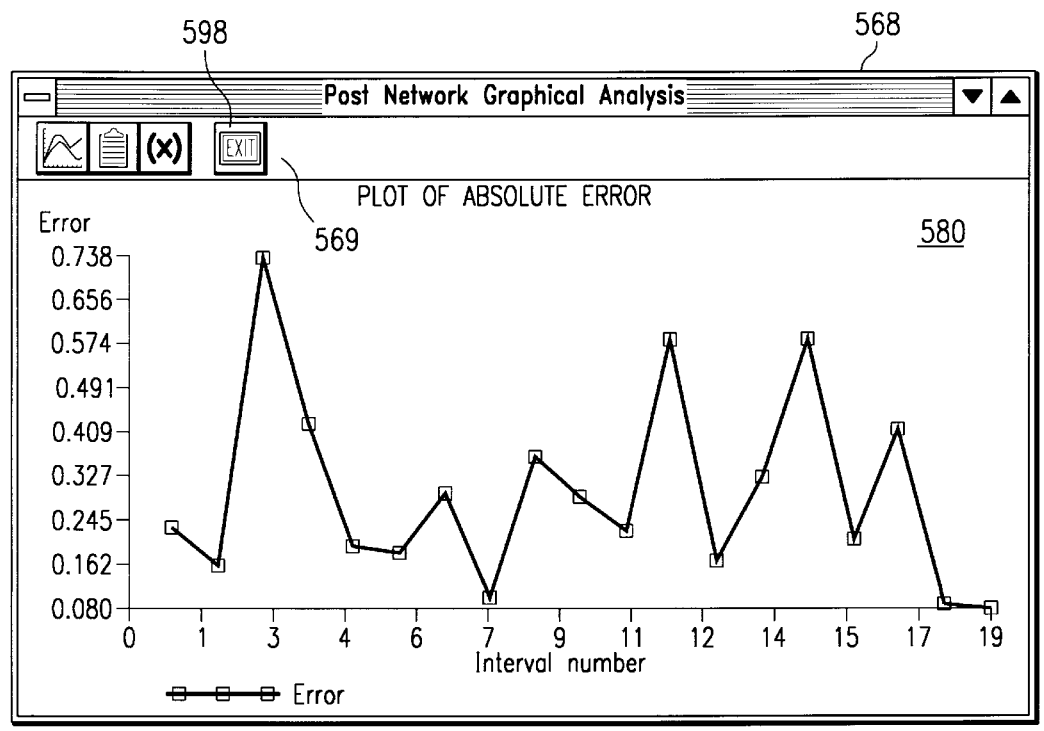
FIG. 28 illustrates an exemplary post-network graphical analysis window with the neural prediction function of the present system and method.

FIG. 28 illustrates an exemplary post network graphical analysis window 568 having toolbar 569. Toolbar 569 preferably includes a number of buttons for accessing graphing options and exit button 598. Window 568 shows exemplary absolute error plot 580 generated in accordance with neural prediction function 38 of data analysis system 10. The example of FIG. 28 displays a plot of absolute error over 19 training intervals (cycles), and from FIG. 28 it can be seen that the error has reduced progressively from an average of above 0.738 down to 0.08 over this training interval.

Data management function 42 of data analysis system 10 of the present invention may be used to perform several operations on data produced by data processor 32. Typical operations available with data management function 42 include data merge, data append, and data pairing operations.

Figure 29:
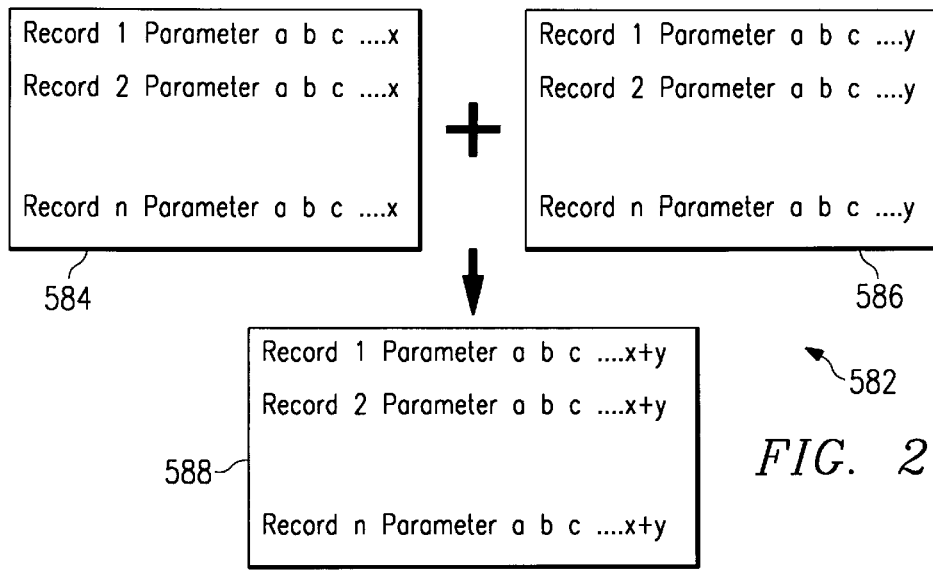
FIG. 29 illustrates a data merge operation in accordance with the present invention.

FIG. 29 illustrates data merge function 582 in accordance with data management function 42 that allows for combining two different files into a single file. Data merge function 582 allows file 584 of length n records and containing x parameters to be merged with file 586, also of length n records but with y parameters, into new file 588 with n records containing x+y parameters. To facilitate the merge operation, input files 584 and 586 preferably do not share any parameter names in common with each other.

Figure 30:
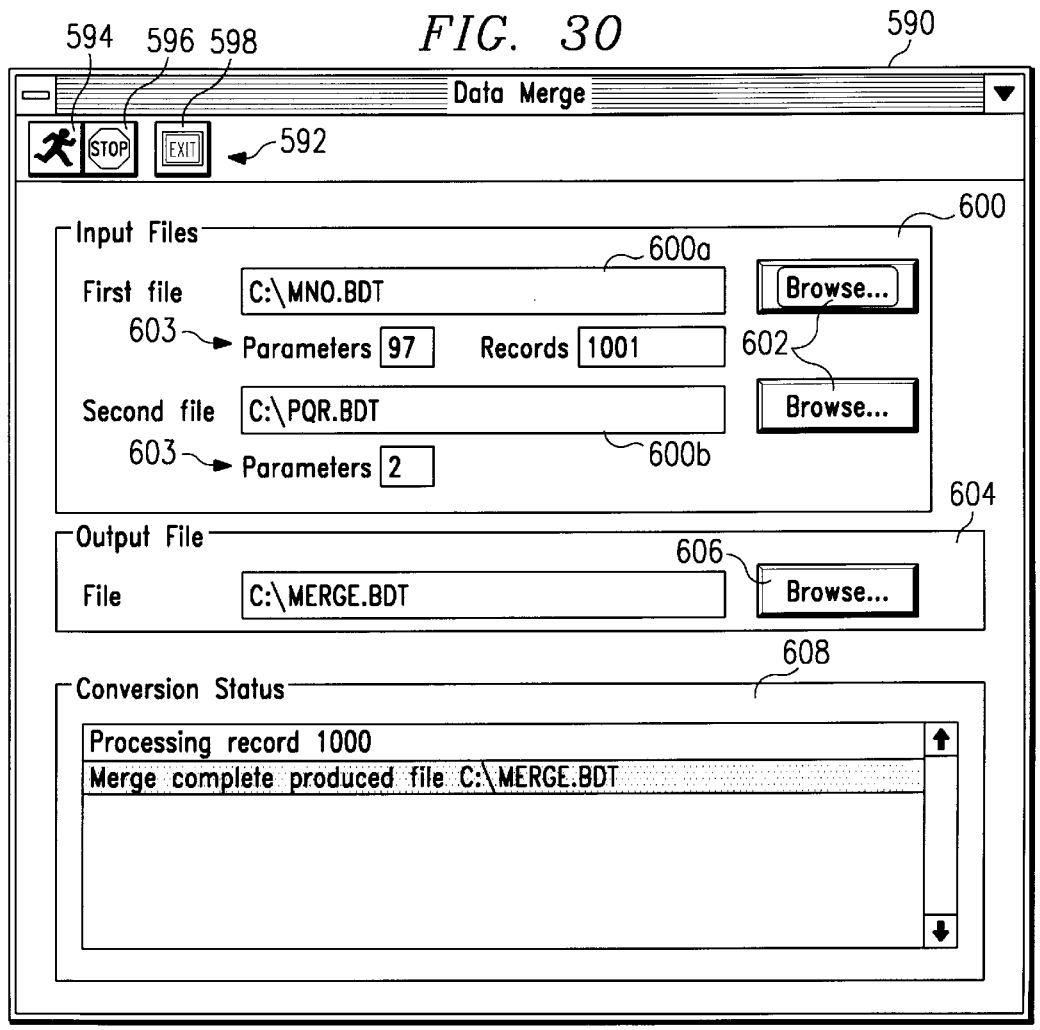
FIG. 30 shows an exemplary data merge window for use with a data merge in accordance with the present invention.

FIG. 30 illustrates an exemplary data merge window 590 for performing data merge function 582 depicted in FIG. 29. Data merge window 590 preferably includes toolbar 592 having run button 594, stop button 596, and exit button 598. Data merge window 590 also preferably includes input files section 600 for specifying the files to be merged in first file field 600a and second file field 600b. Each file field has browse button 602 for providing a file list for selecting files for merging and parameter information 603 for providing information on the parameters in each file.

Data merge window 590 also preferably includes output file section 604 for specifying the file destination and name for the merge of the input files specified in input files section 600. Output file section 604 similarly includes browse button 606 for selecting the destination and name for the merged data files. Data merge window 590 also preferably includes conversion status region 608 that provides a textual description of the status of a data merge.

Figures 31, 32:
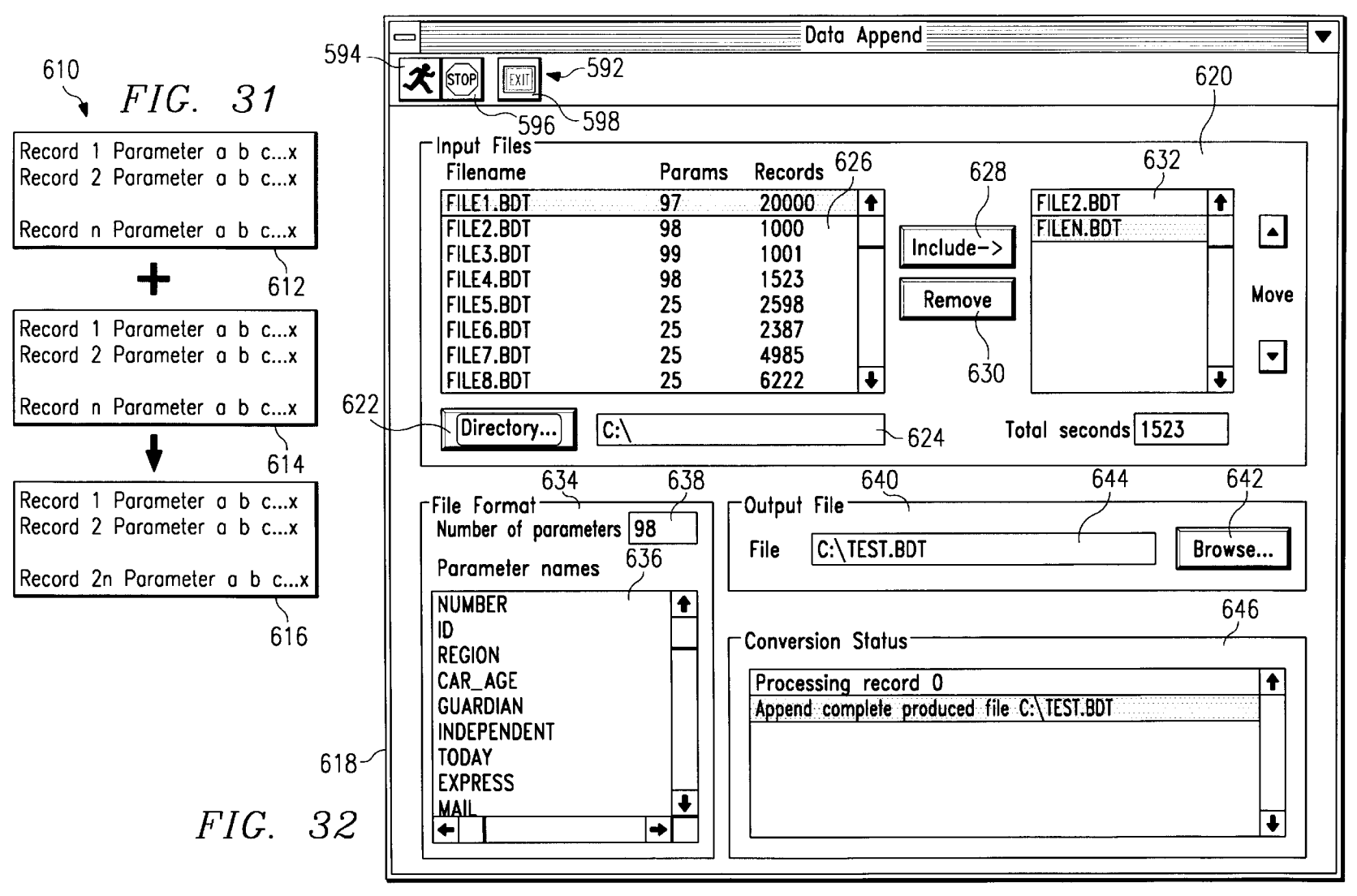

FIG. 31 illustrates data append operation 610 for combining two files of the same type into a single file that may be part of data management function 42 of data analysis system 10. The two files, e.g., files 612 and 614 in FIG. 31, contain identical parameter lists in each file. The parameters in the input files should also be in the same order, with the files also having the same length. Appending file 612 with file 614 results in output file 616.

FIG. 32 illustrates an exemplary data append window 618 for performing data append operation 610 as shown in FIG. 31. Data append window 618 preferably includes toolbar 592 as previously described. Data append window 618 preferably includes input files section 620 that includes directory button 622. By selecting directory button 622 and selecting a directory in directory field 624, a file listing in file listing section 626 is provided. Using include button 628 and remove button 630 the files to be appended may be specified and moved to selected files section 632. Once a file is selected in file listing section 626, file format section 634 provides the parameter names within the file in parameter name section 636 and the number of parameters in the file in number of parameters field 638.

Window 618 also preferably includes output file section 640 having browse button 642 from which a listing of file names may be selected for the output file, e.g., output file 616 in FIG. 31. Output file field 644 displays the output file name. Data append window 618 also preferably includes conversion status section 646 that provides status information on a particular data append operation once run button 594 is selected.

Data management function 42 also preferably includes a data paring capability that allows for paring down a file to contain only those parameters of interest. For example, a tagged file from neural clustering function 36 could be pared down to contain only the cluster identifications and other parameters required for further analysis. Another possible use of the data paring capability is for rationing stored data because of disk storage limitations.

Figure 33:
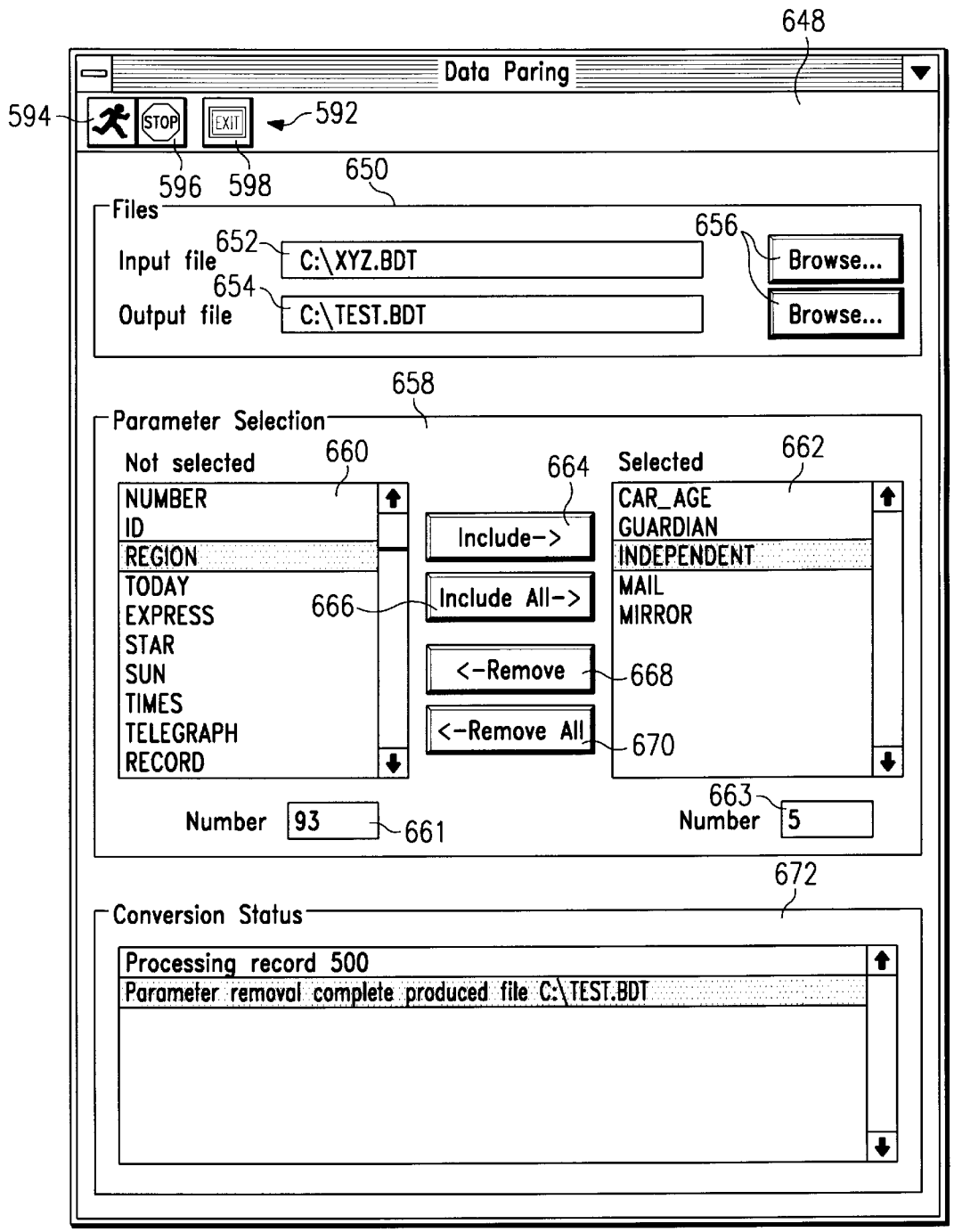
FIG. 33 shows an exemplary data paring window for use with a data paring in accordance with the present invention.

FIG. 33 illustrates an exemplary data paring window 648. Window 648 preferably includes toolbar 592 previously described. Window 648 includes files section 650 having input file field 652 and output file field 654 for specifying the name of the input file to be pared and the name the pared file is to be stored under. Both input 652 and output 654 file fields have a browse capability that may be activated using browse buttons 656. Window 648 also preferably includes parameter selection region 658 including not selected parameter list 660 and selected parameter list 662. Using include button 664, include all button 666, remove button 668, and remove all button 670, the parameters may be moved between lists 660 and 662 to specify a desired data paring.

Data paring window 648 also preferably includes conversion status section 672 that provides a textual description of the status of a particular paring operation once run button 594 is selected.

Figure 34:
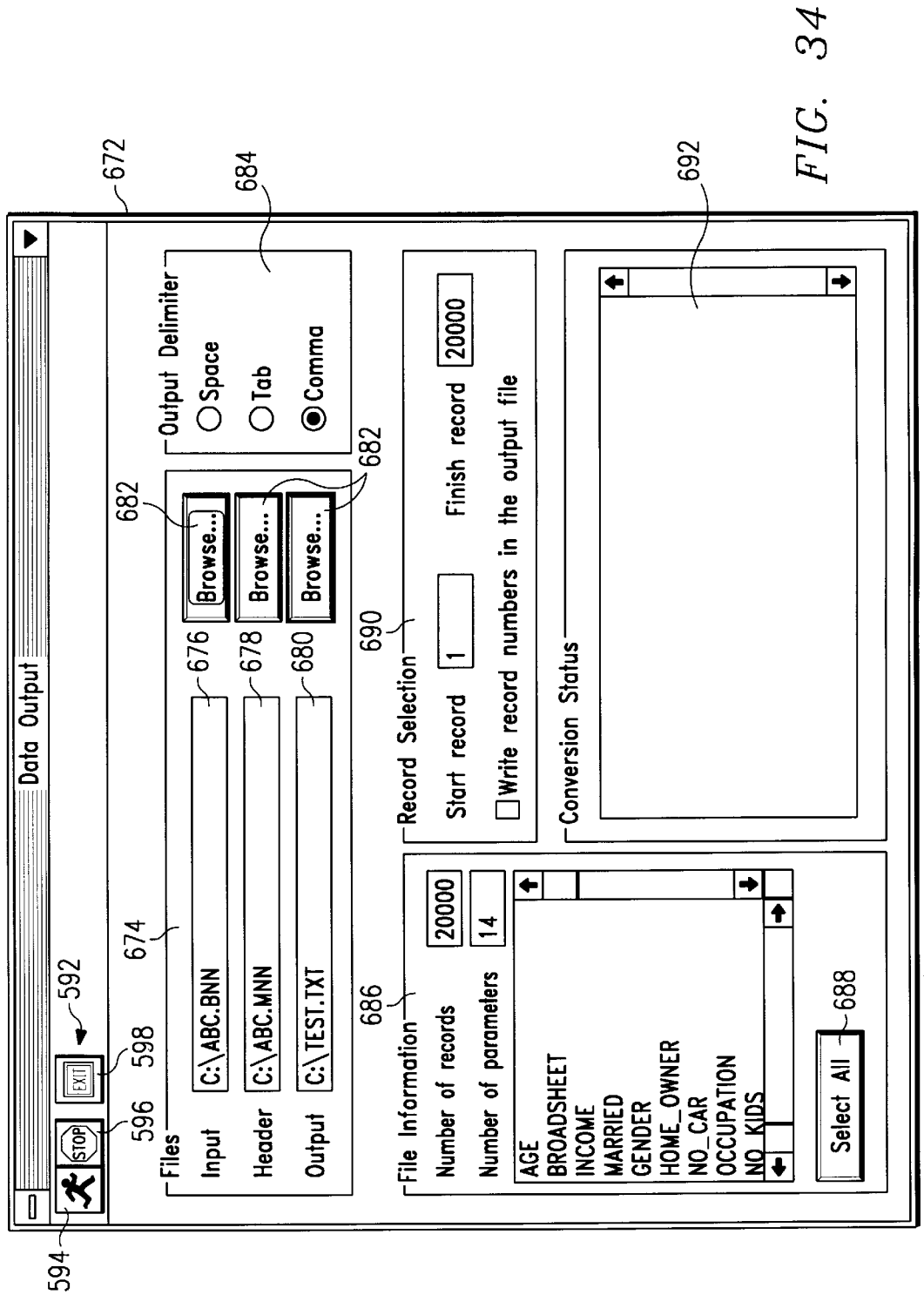
FIG. 34 illustrates an exemplary data output window for outputting data in accordance with the present invention.

FIG. 34 shows an exemplary data output window 672 that provides access to a data output function within data acquisition and output function 40 of data analysis 10 of the present invention. The data output function of data analysis system 10 allows for converting files processed by system 10 back to a format that can be used by other programs. In the embodiment of system 10 where data is processed as a binary file, the data output function of data acquisition and output function 40 may convert a binary file into, for example, an ASCII text format file.

Window 672 preferably includes toolbar 592 previously described. Window 672 preferably includes information section 674 having input file field 676, header file field 678, and output file field 680. A listing of file names for each of these fields may be accessed by selecting one of browse buttons 682. Output delimiter field 684 specifies the type of delimiter to be used in the output file. In the example shown in FIG. 34, space, tab, and comma delimiters are available deliminators for the output file.

Window 672 also preferably includes file information section 686 providing additional information on the input file including the number of records, the number of parameters, and the names of the parameters within the input file. Select all button 688 within file information section 686 may be selected to include all of the records and their parameters in the input file for conversion to the output file.

Data output window 672 also preferably includes record selection region 690 that allows for specifying the start record and finish record for the input file for conversion to the output file. Also, window 672 preferably includes conversion status region 692 that provides a textual description of the status of a data output operation once run button 594 is selected.

Although the present invention has been described in detail, it should be understood that various changes, substitutions, and alterations can be made hereto without departing from the spirit and scope of the invention as defined by the appended claims.

What is claimed is:

1. A system for analyzing a data file containing a plurality of data records, each data record containing a plurality of parameters, the system comprising:
   an input for receiving the data file; and
   a data processor comprising a clustering function for clustering the data records into a plurality of clusters containing data records having similar parameters wherein the clustering function is further operable to generate a cluster map including a graphical depiction of the clusters, wherein the cluster map comprises a plurality of graphical elements each having a graphical depiction indicative of a number of records in a cluster.

2. The system of claim 1 wherein the input is further operable to convert the data records into a processing format for the data processor.

3. The system of claim 2 further comprising an output operable to convert the data records in the processing format back to their original format.

4. The system of claim 2 wherein the data records in the data file are in ASCII format and are processed in binary format in the data processor.

5. The system of claim 1 further comprising a data manager for manipulating the data file.

6. The system of claim 5 wherein the data manager further comprises a data append function for appending data files.

7. The system of claim 5 wherein the data manager further comprises a data merge function for merging data files.

8. The system of claim 5 wherein the data manager further comprises a data paring function for paring parameters from a data file.

9. The system of claim 1 wherein the cluster map is color coded to depict the relative number of records in each cluster.

10. The system of claim 1 wherein the clustering function is further operable to provide statistics for each parameter for the records in a cluster.

11. The system of claim 1 wherein the clustering function is further operable to provide a parameter graph for each parameter in the records in a cluster.

12. The system of claim 1 wherein the clustering function further comprises a neural clustering function.

13. The system of claim 1 wherein the data processor further comprises a prediction function for predicting expected future results from the parameters in the data records.

14. The system of claim 13 wherein the prediction function further comprises a neural prediction function.

15. The system of claim 1 wherein the data processor further comprises a segmentation function for segmenting the data records into a plurality of segments based on the parameters.

16. The system of claim 15 wherein the segmentation function is further operable to provide statistics on the data records.

17. The system of claim 15 wherein the segmentation function is further operable to segment the data records into a plurality of segments using segmentation logic.

18. The system of claim 15 wherein the segmentation function is further operable to segment an existing segment into additional segments.

19. The system of claim 1 wherein the clustering function is further operable to identify characteristic profiles for each group.

20. The system of claim 13 wherein the prediction function employs a multi-layer perception network in predicting the expected future results.

21. The system of claim 1 wherein the data records further comprise customer data records containing a plurality of customer parameters in each customer record.

22. The system of claim 15 wherein the data records further comprise customer data records containing a plurality of customer parameters in each customer record and wherein the segmentation function is further operable to segment the customer data records into logical groups of customers.

23. The system of claim 21 wherein the clustering function is further operable to cluster customer data records into statistically significant groups of customers.

24. The system of claim 13 wherein the data records further comprise customer data records containing a plurality of customer parameters in each customer record and wherein the prediction function is further operable to predict customer behavior from the customer data records.

25. The system of claim 13 wherein the data records further comprise customer data records containing a plurality of customer parameters in each customer record and wherein the prediction function is further operable to predict customer behavior from current customer data records.

26. The system of claim 15 wherein the segmentation function is further operable to identify statistics for each segment.

27. The system of claim 15 wherein the segmentation function is further operable to identify statistical distributions for each segment.

28. The system of claim 15 wherein the segmentation function is further operable to generate a histogram for each parameter in the data records.

29. The system of claim 15 wherein the segmentation function is further operable to generate a histogram for a data segment.

30. The system of claim 1 wherein the clustering function is further operable to generate a histogram for each cluster.

31. A system for analyzing a data file containing a plurality of customer data records, each data record containing a plurality of customer parameters, the system comprising:

an input for receiving the data file; and
a data processor for processing the data records, the data processor further comprising
a segmentation function for segmenting the customer data records into a plurality of segments based on the parameters,
a clustering function for clustering the customer data records into a plurality of customer groups having similar parameters, and
a prediction function for predicting customer behavior from the customer data records.

32. The system of claim 31 further comprising a data manager for manipulating the data file.

33. The system of claim 32 wherein the data manager further comprises a data append function for appending data files.

34. The system of claim 32 wherein the data manager further comprises a data merge function for merging data files.

35. The system of claim 32 wherein the data manager further comprises a data paring function for paring parameters from a data file.

36. The system of claim 31 wherein the segmentation function is further operable to provide statistics on the data records.

37. The system of claim 31 wherein the segmentation function is further operable to segment the data records into a plurality of segments using segmentation logic.

38. The system of claim 31 wherein the segmentation function is further operable to segment an existing segment into additional segments.

39. The system of claim 31 wherein the clustering function is further operable to identify characteristic profiles for each customer group.

40. The system of claim 31 wherein the prediction function is further operable to predict prospective customer behavior from current customer data records.

41. The system of claim 31 wherein the segmentation function is further operable to identify statistical distributions for each segment.

42. The system of claim 31 wherein the segmentation function is further operable to generate a histogram for each parameter in the data records.

43. The system of claim 31 wherein the segmentation function is further operable to generate a histogram for a segment.

44. The system of claim 31 wherein the clustering function is operable to generate a histogram for each cluster.

45. The system of claim 31 wherein the clustering function is further operable to generate a cluster map depicting the number of records in each cluster.

46. The system of claim 45 wherein the cluster map is color coded to depict the relative number of records in each cluster.

47. The system of claim 31 wherein the clustering function is further operable to provide statistics for each parameter for the records in a cluster.

48. The system of claim 31 wherein the clustering function is further operable to provide a parameter graphs for each parameter in the records in a cluster.

49. A method for analyzing a data file containing a plurality of data records, each data record containing a plurality of parameters, the method comprises the steps of:

inputting the data file; and
processing the data file by
segmenting the data records into a plurality of segments based on the parameters,
clustering the data records into a plurality of clusters containing data records having similar parameters, and
predicting expected future results from the parameters in the data records.

50. The method of claim 49 wherein the inputting step further comprises converting the data records into a predetermined processing format.

51. The method of claim 50 further comprising the step of converting the data records in the processing format back to their original format.

52. The method of claim 49 further comprising the step of appending data files together.

53. The method of claim 49 further comprising the step of merging data files together.

54. The method of claim 49 further comprising the step of paring parameters from a data file.

55. The method of claim 49 wherein the segmenting step further comprises providing statistics on the data records.

56. The method of claim 49 wherein the segmenting step further comprises segmenting an existing segment into additional segments.

57. The method of claim 49 wherein the clustering step further comprises clustering the data records into groups having similar parameters.

58. The method of claim 57 wherein the clustering step further comprises identifying characteristic profiles for each group.

59. The method of claim 49 wherein the data records further comprise customer data records containing a plurality of customer parameters in each customer record.

60. The method of claim 59 wherein the segmenting step further comprises segmenting the customer data records into groups of customers.

61. The method of claim 59 wherein the clustering step further comprises clustering customer data records into statistically significant groups of customers.

62. The method of claim 59 wherein the predicting step further comprises predicting customer behavior from the customer data records.

63. The method of claim 59 wherein the predicting step further comprises predicting prospective customer behavior from the customer data records.

64. The method of claim 49 wherein the segmenting step further comprises generating a histogram for each parameter in the data records.

65. The method of claim 49 wherein the segmenting step further comprises generating a histogram for a data segment.

66. The method of claim 49 wherein the clustering step further comprises generating a histogram for each cluster.

* * * * *